(12) United States Patent
Sato

(10) Patent No.: US 6,487,024 B2
(45) Date of Patent: Nov. 26, 2002

(54) ZOOM LENS SYSTEM AND PHOTOGRAPHIC DEVICE EQUIPPED THEREWITH

(75) Inventor: Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/838,167

(22) Filed: Apr. 20, 2001

(65) Prior Publication Data

US 2001/0046090 A1 Nov. 29, 2001

(30) Foreign Application Priority Data

Apr. 20, 2000 (JP) .................................. 2000-119853
Apr. 12, 2001 (JP) .................................. 2001-113513

(51) Int. Cl.⁷ ............................................. G02B 15/14
(52) U.S. Cl. ...................................... 359/691; 359/682
(58) Field of Search .............................. 359/691, 682, 359/708, 690, 683, 793, 713, 681

(56) References Cited

U.S. PATENT DOCUMENTS 5,793,536 A   8/1998   Sato ........................... 359/691

FOREIGN PATENT DOCUMENTS

JP    8-334694    12/1996

*Primary Examiner*—Hung Xuan Dang
(74) *Attorney, Agent, or Firm*—Miles & Stockbridge P.C.

(57) ABSTRACT

The object of the present invention is to provide a negative-positive, two-group type zoom lens system having a uniquely high zoom ratio of about 3.5, and having relatively small diameter and compactness with small number of lens element. According to one aspect, a zoom lens system includes, in order from an object-side, a first lens group having negative refractive power and a second lens group having positive refractive power. Zooming is carried out by varying the space between the first lens group and the second lens group. The first lens group includes, in order from the object side, a negative lens group $G_{1F}$ composed of one or two negative lens element, and a positive lens group $G_{1R}$. The following conditional expressions are satisfied:

$$4.5 \leq |X_2| \cdot f_t / f_w^2 \leq 15 \quad (1)$$

$$0.7 \leq |f_1| / (f_w \cdot f_t)^{1/2} \leq 1.3 \quad (2)$$

where $X_2$ denotes the maximum moving amount of the second lens group while zooming, $f_1$ denotes the focal length of the first lens group, $f_w$ denotes the focal length of the zoom lens system in a wide-angle end state, and $f_t$ denotes the focal length of the zoom lens system in a telephoto end state.

9 Claims, 16 Drawing Sheets

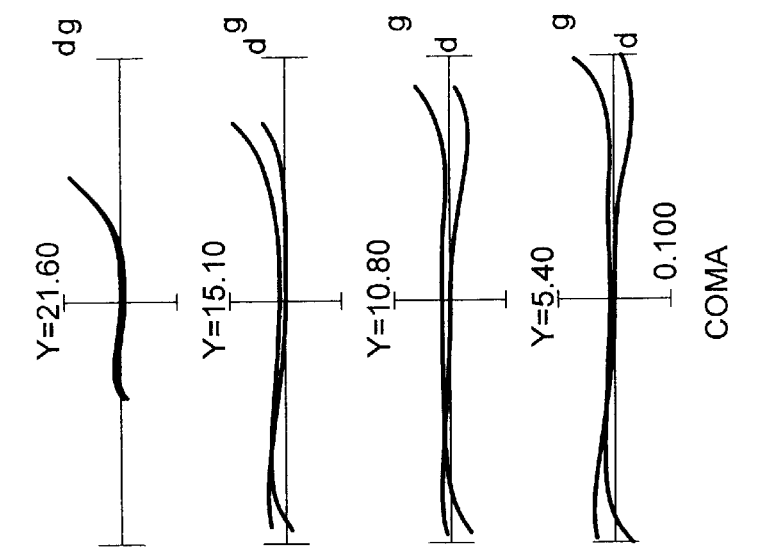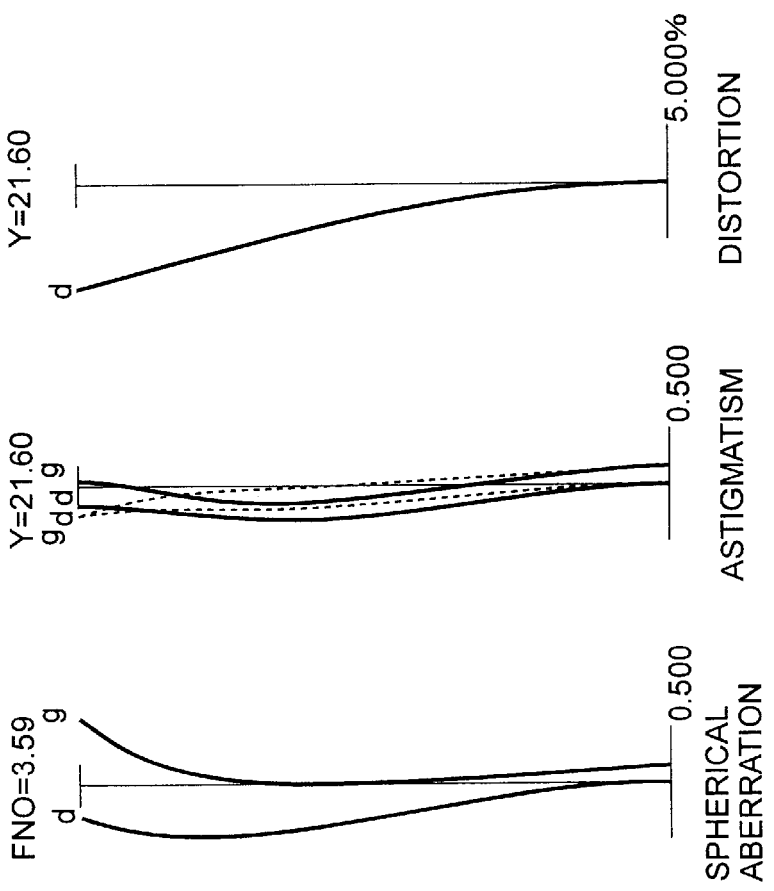

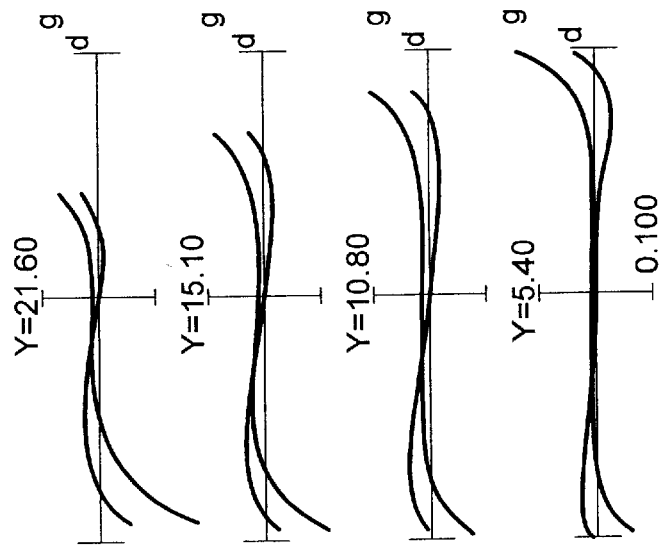

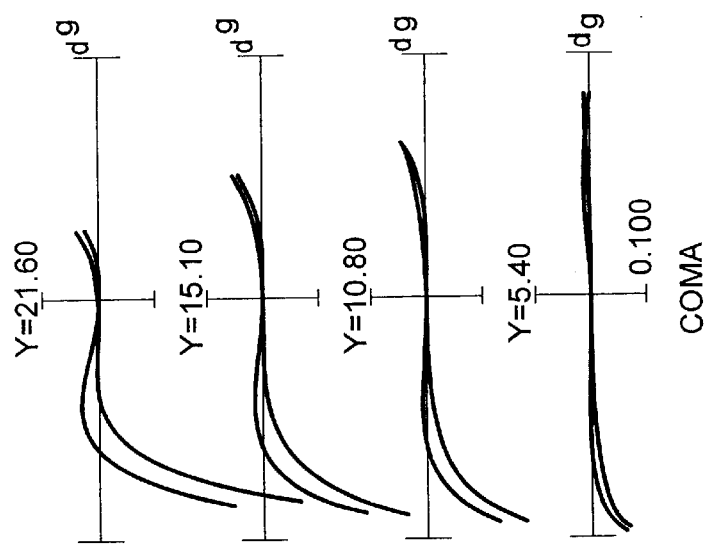
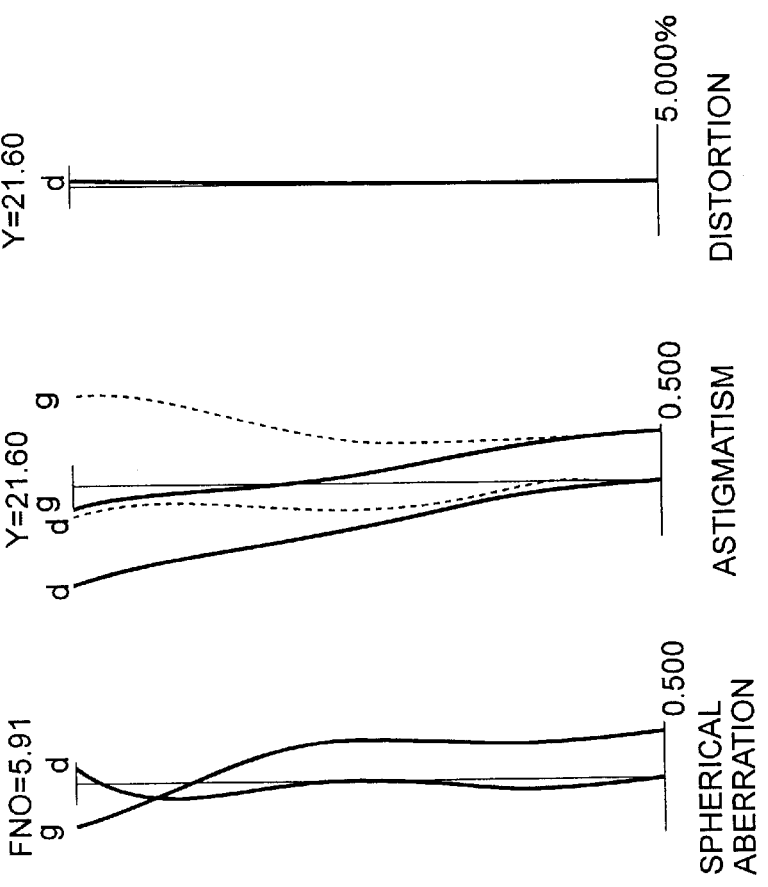
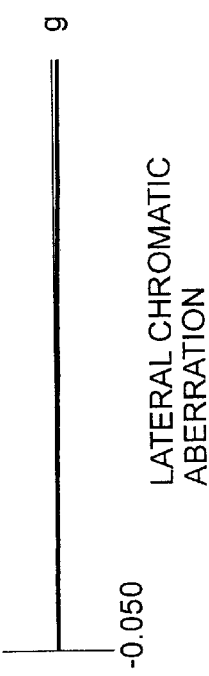

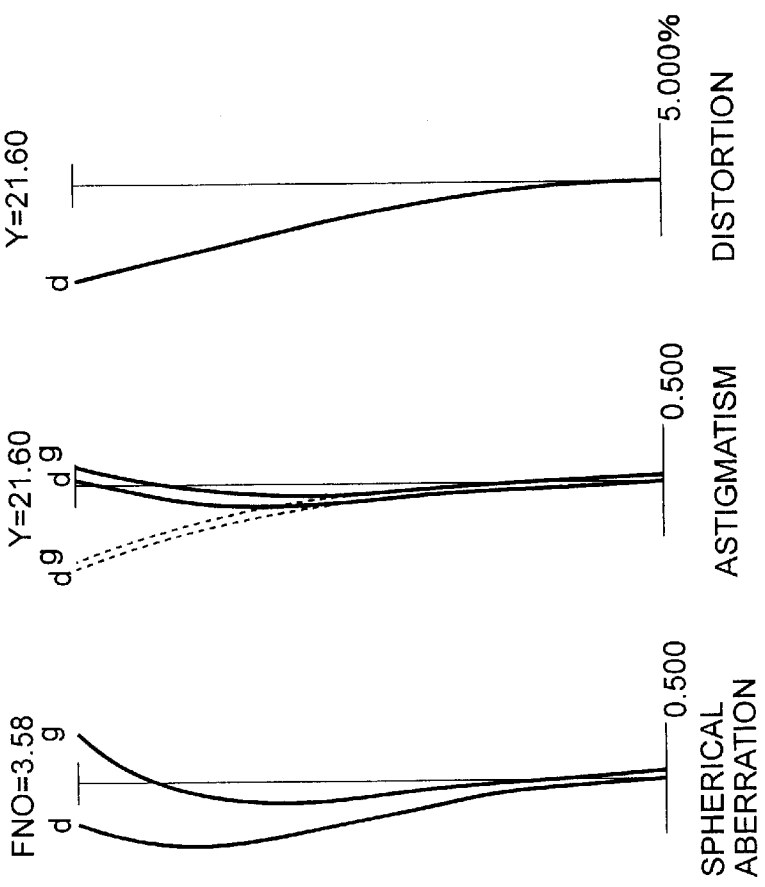
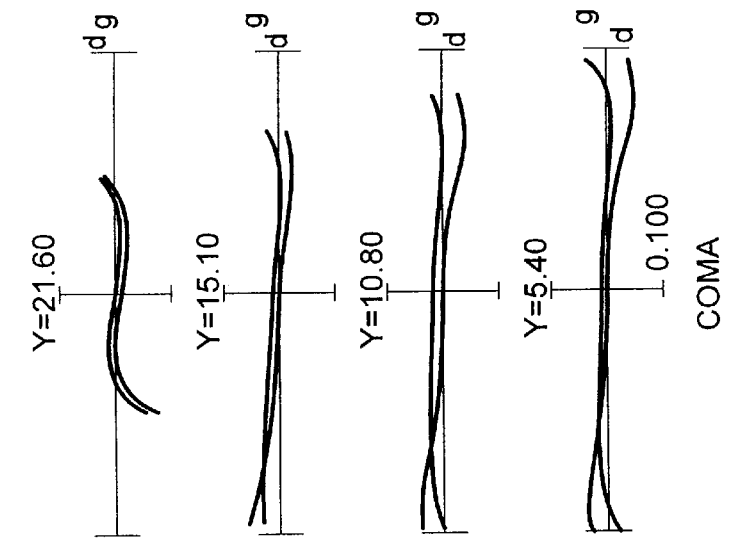
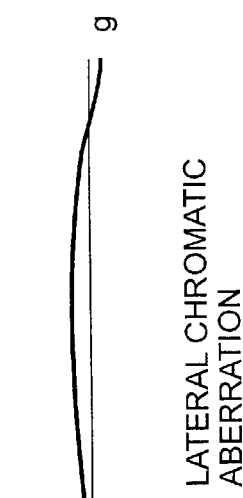

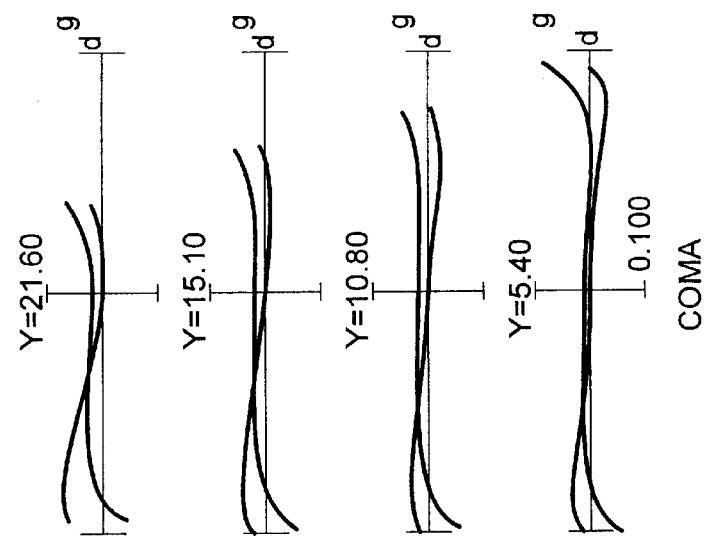
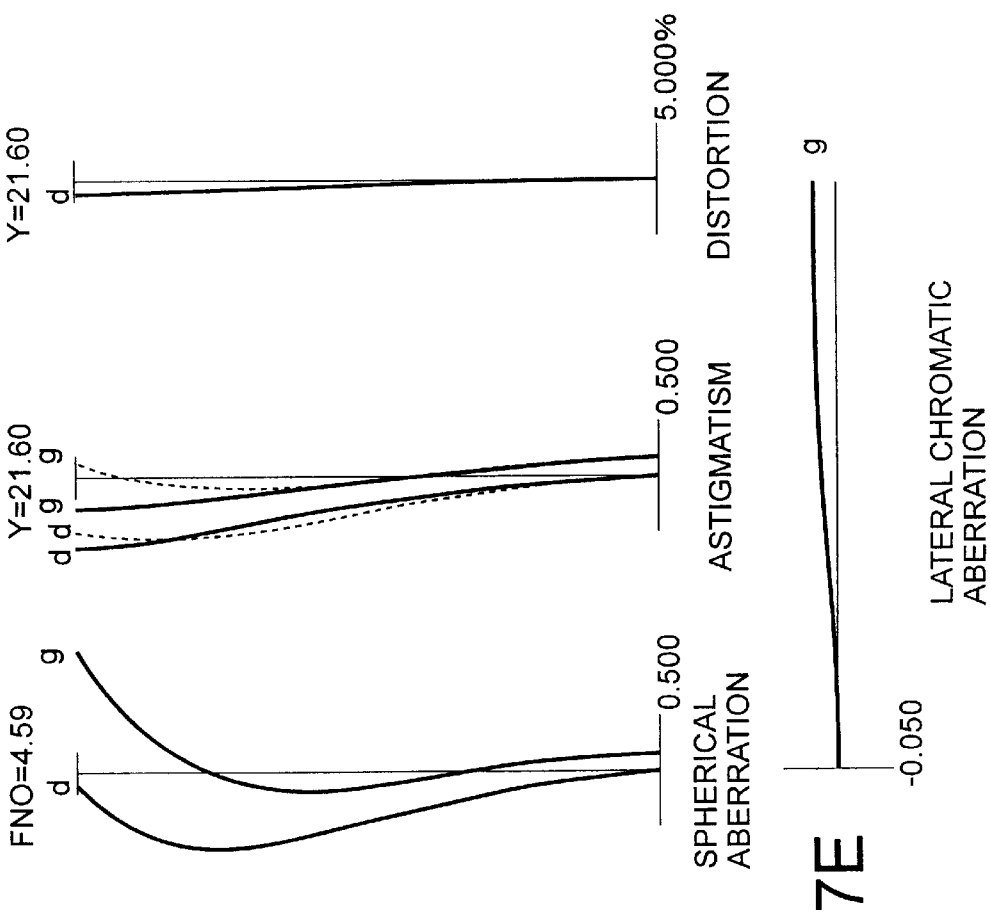

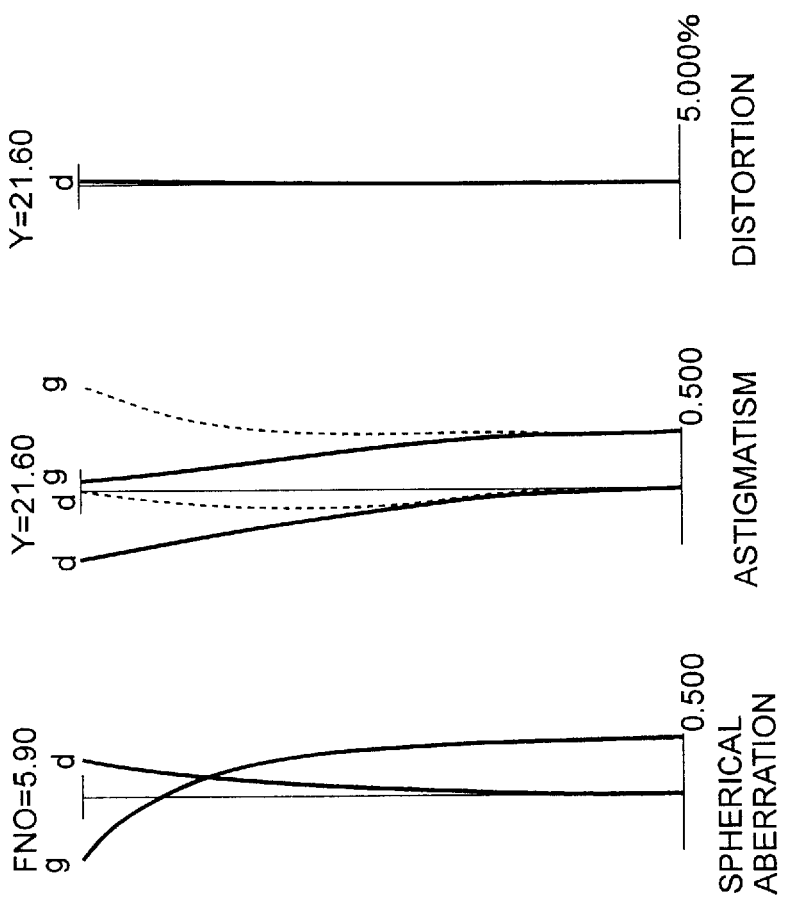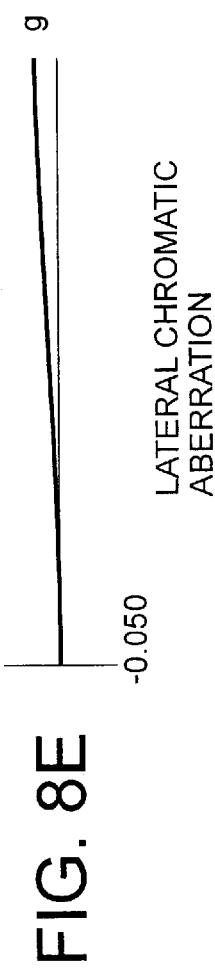

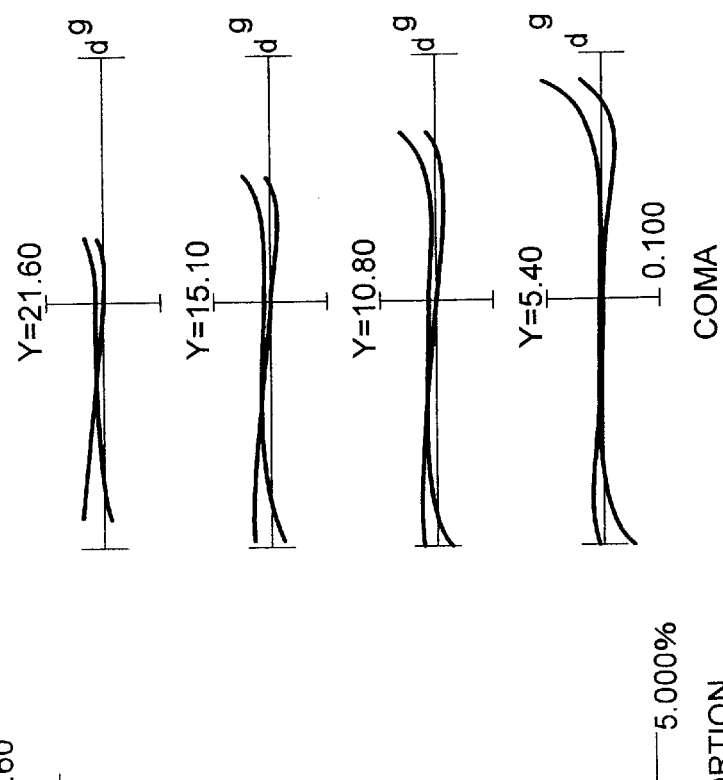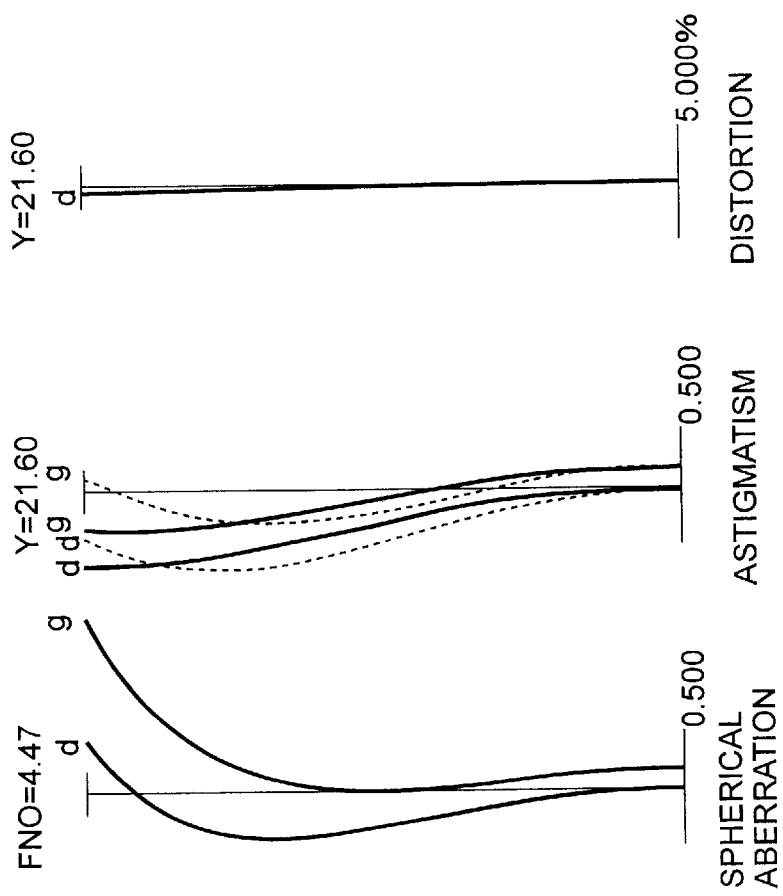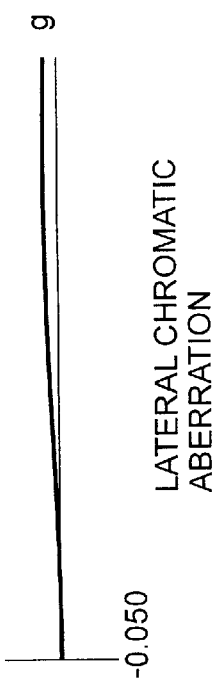

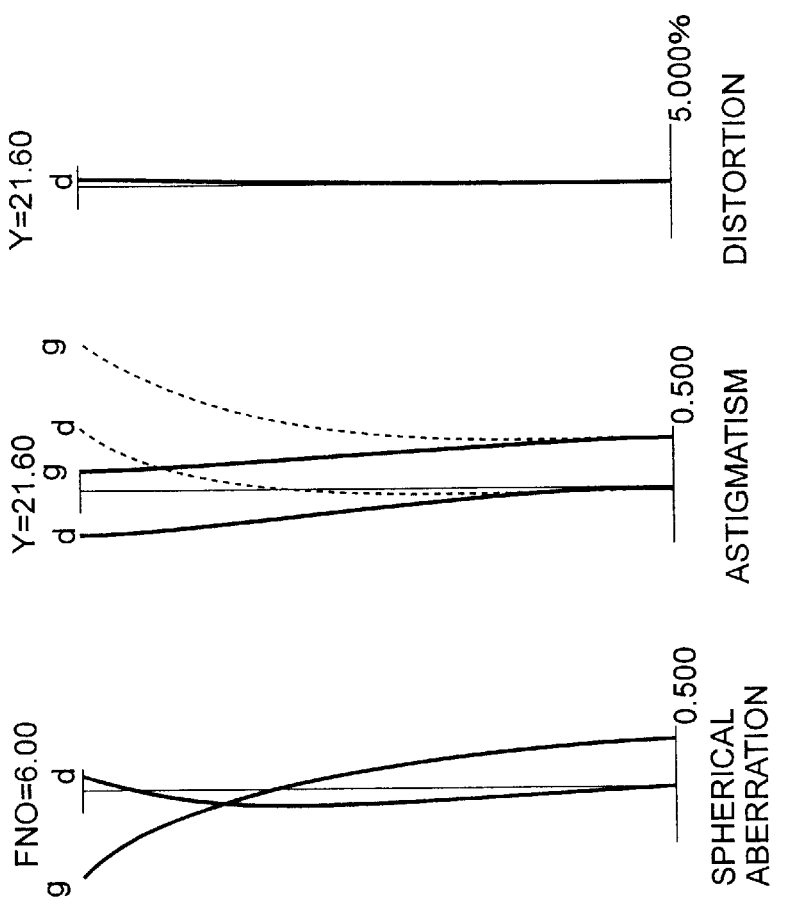
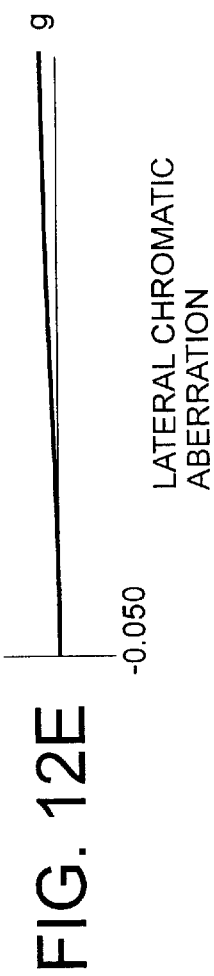

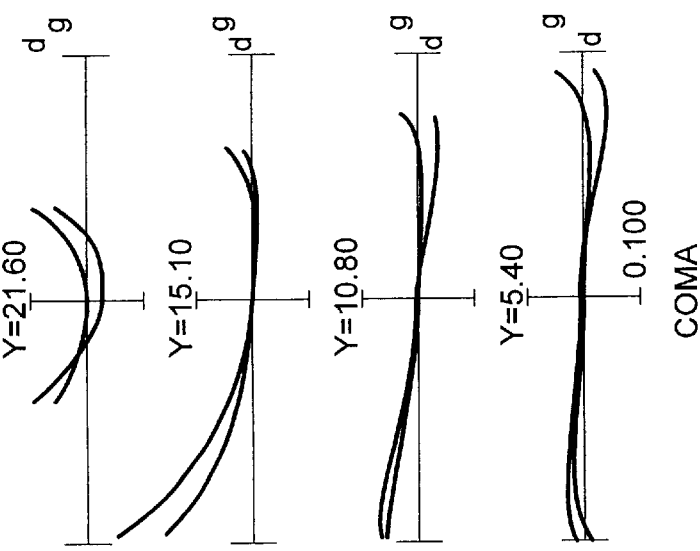
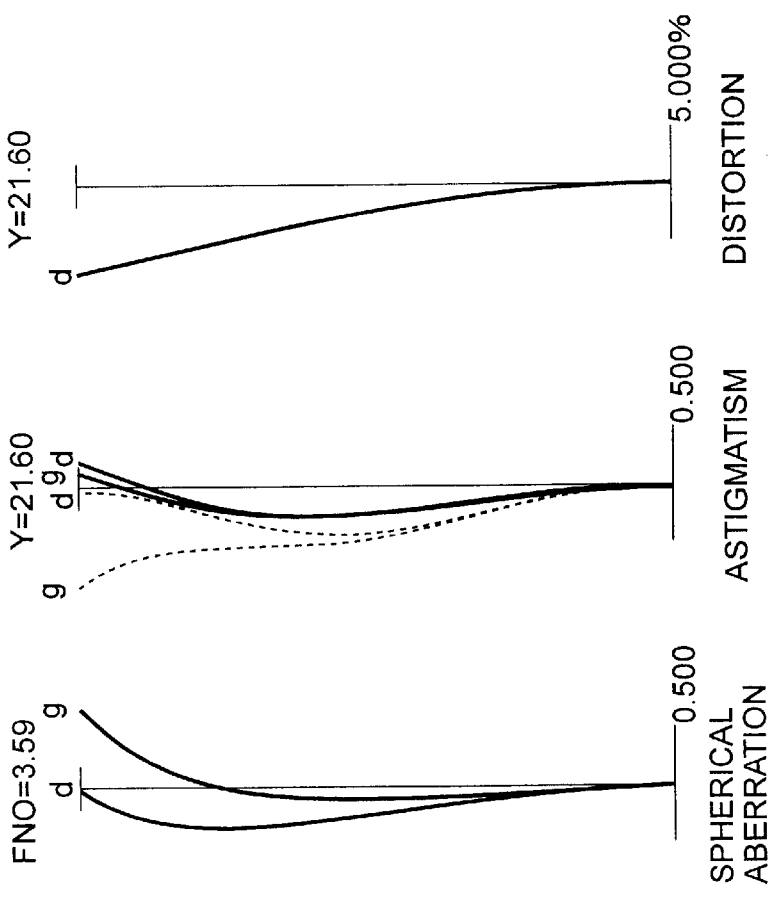
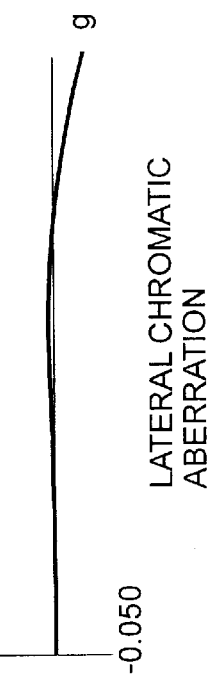

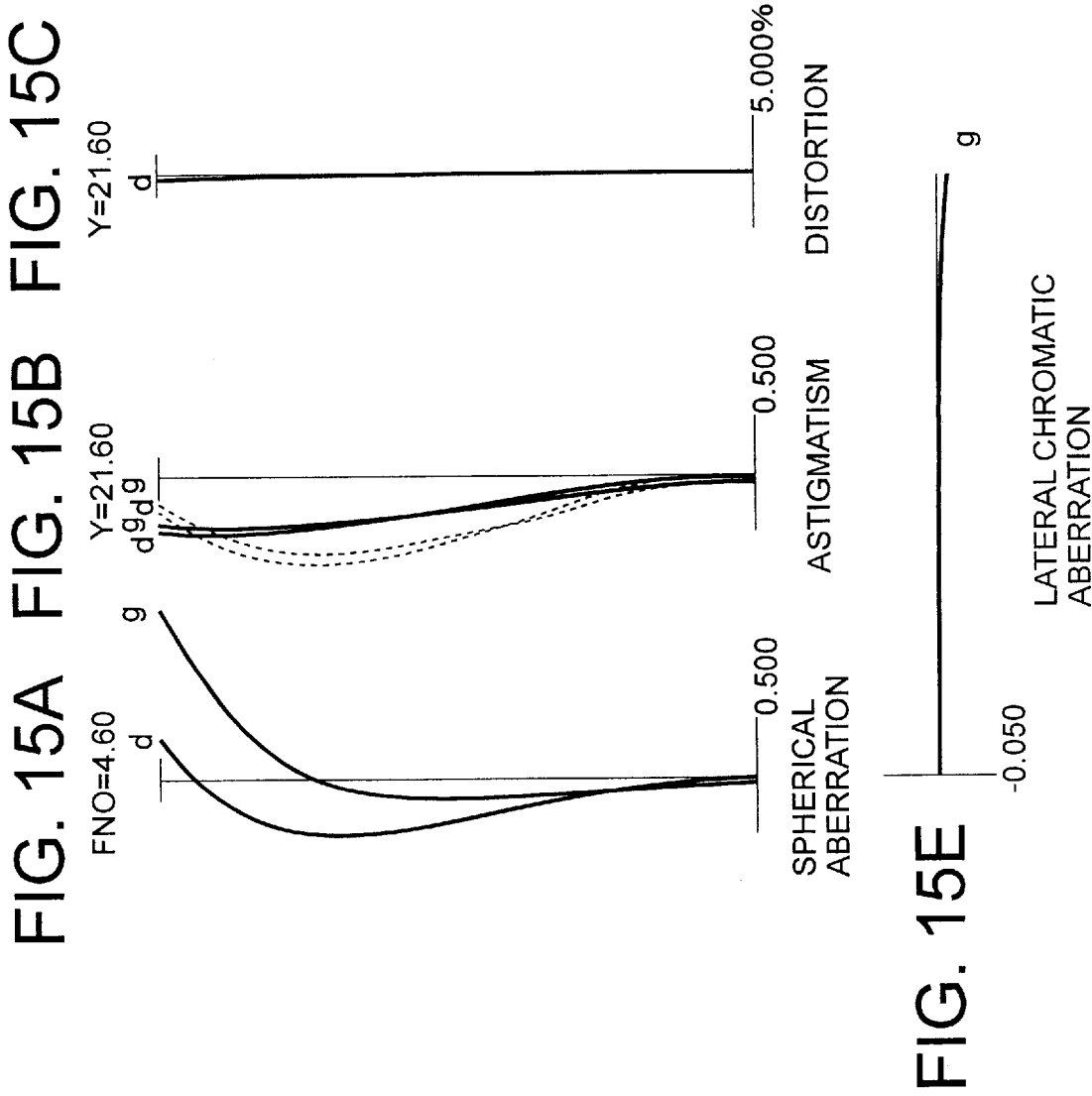

ZOOM LENS SYSTEM AND PHOTOGRAPHIC DEVICE EQUIPPED THEREWITH

INCORPORATION BY REFERENCE

The disclosures of the following priority applications are herein incorporated by reference:

Japanese Patent Application No. 2000-119853 filed Apr. 20, 2000

Japanese Patent Application No. 2001-113513 filed Apr. 12, 2001

BACKGROUND OF THE INVENTION

1. Field of the Invention

The present invention relates to a very-low-priced and high-zoom-ratio standard zoom lens system having lens construction of a negative-positive two-group type zoom lens system, or a three-group type zoom lens system having very simple lens construction similar to the aforesaid zoom lens system such as a negative-positive-negative type, a negative-positive-positive type, or the like, and relates to a photographic device equipped thereof

2. Description of Related Art

It has recently become common for a so-called standard zoom lens equipped with a single lens reflex camera to be used as a common-use lens instead of a standard lens. Accordingly, since this kind of zoom lens is always carried in a state equipped with a camera, it is necessary for the zoom lens to be light and compact as well as to have sufficient optical performance and cost performance. In order to satisfy the necessary condition, a two-group type zoom lens system consisting of a negative and a positive lens groups is the best choice, so that a lot of zoom lens system of this type have been proposed.

However, it has been thought to b difficult for a two-group type zoom lens system to satisfy both a large aperture ratio and a high zoom ratio. In order to realize especially a high zoom ratio, it is necessary to extremely increase the power of each lens group, which exists only two, within a practical range of a dimension and a diameter as a so-called standard zoom lens. Therefore, it has been the upper limit according to prior art to keep the zoom ratio about 2.8. Above all, a zoom lens disclosed in Japanese Laid-Open patent application Ser. No. 8-334694 applied by the same assignee of the present patent application has been known for realizing the highest possible zoom ratio of 2.83 as this type of compact zoom lens.

Moreover, in a standard zoom lens for a 35 mm film format, the range of variable focal length obtained by a two-group type zoom lens or a three-group type zoom lens (such as a negative-positive-negative type, a negative-positive-positive type, or the like) which is a modification of the two-group type zoom lens has been nominally about 2.8 such as 35–80 mm, 28–80 mm, or the like. Accordingly, it has been necessary for a zoom lens whose zoom ratio is three or over such as 28–105 mm to employ zoom lens construction of a four-group type or a five-group type. The four- or five-group type zoom lens naturally has complicated construction and increases the number of moving groups Moreover, the number of lens elements has become excessively large; for example, it has been generally 13–18 lens elements. Furthermore, the increase of the lens elements has caused the increase of the dimension and the weight. In addition, a technical hurdle of assembling technique has become high, and, finally, the all items have become factors of cost increase. Therefore, a four- or five-group type zoom lens has not been able to be provided cheaper than a two-group type.

In a zoom lens disclosed in Japanese Laid-Open Patent Application No. 8-334694, although the zoom lens is compact and has a small number of lens element, in order to satisfy both the zoom ratio of about 3.5 and the compactness and low cost, it has been necessary to develop optimum power arrangement and lens construction.

SUMMARY OF THE INVENTION

The present invention is made in view of the aforementioned problems and has an object to provide a two-group type zoom lens system consisting of a negative and a positive lens groups having an extremely high zoom ratio of about 3.5, which has been unique so far in any prior art, with very simple lens construction, compactness and a small diameter, and to provide a photographic device equipped with the zoom lens system.

According to one aspect of the present invention, a zoom lens system includes, in order from an object side, a first lens group having a negative refractive power, and a second lens group having a positive refractive power. Zooming is carried out by varying the space between the first lens group and the second lens group. The first lens group includes, in order from the object side, a negative lens group $G_{1F}$ composed of one or two-negative lens element, and a positive lens group $G_{1R}$. The following conditional expressions are satisfied;

$$4.5 \leq |X_2| \cdot f_t/f_w^2 \leq 15 \quad (1)$$

$$0.7 \leq |f_1|/(f_w \cdot f_t)^{1/2} \leq 1.3 \quad (2)$$

where $X_2$ denotes the maximum moving amount of the second lens group while zooming, $f_1$ denotes the focal length of the first lens group, $f_w$ denotes the focal length of the zoom lens system in a wide-angle end state, and $f_t$ denotes the focal length of the zoom lens system in a telephoto end state.

In one preferred embodiment of the present invention, the following conditional expression is satisfied:

$$0.6 \leq f_2/BF_w \leq 2 \quad (3)$$

where $f_2$ denotes the focal length of the second lens group, and $BF_w$ denotes the back focal length of the zoom lens system in the wide-angle end state.

In one preferred embodiment of the present invention, the second lens group further includes an aperture stop for defining an f-number of the zoom lens system, a positive lens group $G_{2F}$ including at least two positive lens element located to the object side of the aperture stop, and a negative lens group $G_{2R}$ including at least one negative lens element located to an image side of the aperture stop. The following conditional expression is satisfied:

$$-1 \leq f_{2F}/f_{2R} \leq -0.05 \quad (4)$$

where $f_{2F}$ denotes the focal length of the positive lens group $G_{2F}$, and $f_{2R}$ denotes the focal length of the negative lens group $G_{2R}$.

In one preferred embodiment of the present invention, the negative lens group $G_{1F}$ in the first lens group includes at least one aspherical surface. The aspherical surface is defined by the following expression:

$$S(y) = (y^2/R)/[1+(1-\kappa \cdot y^2/R^2)^{1/2}] + C3 \cdot |y|^3 + C4 \cdot y^4 + C5 \cdot |y|^5 + C6 \cdot y^6 + C8 \cdot y^8 + C10 \cdot y^{10} + C12 \cdot y^{12} + C14 \cdot y^{14}$$

where y denotes the height in a vertical direction relative to the optical axis, S(y) denotes displacement (sag amount) in the optical axis direction from the tangent plane on the vertex of the aspherical surface at the height y, R denotes a paraxial radius of curvature, κ denotes the conical coefficient, and Cn denotes n-th order aspherical surface coefficient. The conical coefficient κ satisfies the following conditional expression;

$$0 \leq \kappa < 1 \qquad (5).$$

According to another aspect of the present invention, a photographic device is equipped with the zoom lens system described above.

BRIEF DESCRIPTION OF THE DRAWINGS

FIGS. 2A to 2E graphically show various aberrations of the zoom lens system according to Example 1 in the wide-angle end state when the lens system is focused at an infinite distance.

FIGS. 3A to 3E graphically show various aberrations of the zoom lens system according to Example 1 in the intermediate focal length state when the lens system is focused at an infinite distance.

FIGS. 4A to 4E graphically show various aberrations of the zoom lens system according to Example 1 in the telephoto end state when the lens system is focused at an infinite distance.

FIGS. 6A to 6E graphically show various aberrations of the zoom lens system according to Example 2 in the wide-angle end state when the lens system is focused at an infinite distance.

FIGS. 7A to 7E graphically show various aberrations of the zoom lens system according to Example 2 in the intermediate focal length state when the lens system is focused at an infinite distance.

FIGS. 8A to 8E graphically show various aberrations of the zoom lens system according to Example 2 in the telephoto end state when the lens system is focused at an infinite distance.

FIGS. 11A to 11E graphically show various aberrations of the zoom lens system according to Example 3 in the intermediate focal length state when the lens system is focused at an infinite distance.

FIGS. 12A to 12E graphically show various aberrations of the zoom lens system according to Example 3 in the telephoto end state when the lens system is focused at an infinite distance.

FIGS. 14A to 14E graphically show various aberrations of the zoom lens system according to Example 4 in the wide-angle end state when the lens system is focused at an infinite distance.

FIGS. 15A to 15E graphically show various aberrations of the zoom lens system according to Example 4 in the intermediate focal length state when the lens system is focused at an infinite distance.

DESCRIPTION OF THE PREFERRED EMBODIMENTS

Figure 1A:
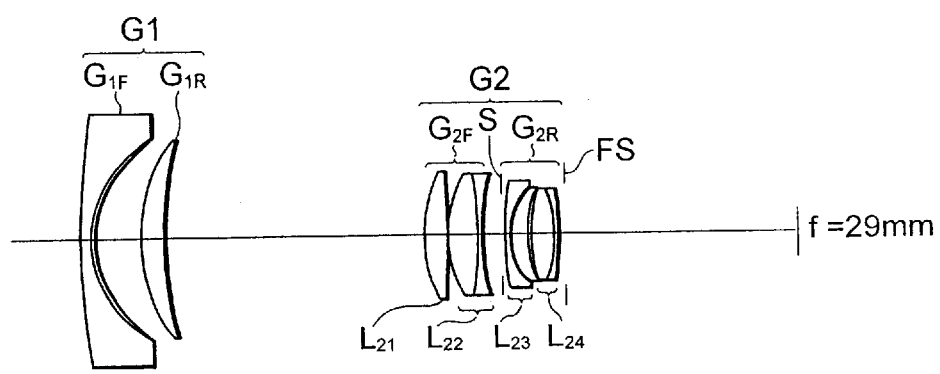
FIGS. 1A to 1C are diagrams showing the lens arrangement of a zoom lens system according to Example 1 of the present invention, together with the movement of each lens group during zooming.

First, the fundamental construction of a zoom lens system according to the present invention is explained. The present invention provides a two-group type zoom lens system consisting of a negative and a positive lens groups having an extremely high zoom ratio, which has been unique so far in any prior art, keeping a practical size, weight, and an outer diameter. In designing the two-group type zoom lens system consisting of a negative group and a positive lens group, which is the smallest construction of a zoom lens system, various kinds of limitations must be satisfied in order to accomplish the zoom ratio of three or over and reaching about 3.5. The most important limitation among them is refractive power of the first and second lens groups, and an optimum lens arrangement of the first and second lens groups.

The most important point to notice is to keep the size and weight within a tolerable range for common use as a standard zoom lens. Therefore, in a zoom lens system according to the present invention, the refractive power of each lens group is made stronger. In particular, it is necessary for the refractive power of the second lens group to be set to an optimum value in consideration of the zoom ratio and a moving amount of each lens group, an aperture ratio, and aberration correction as described below. Moreover, it is necessary for the refractive power of the first lens group to be set to an optimum value in consideration of the diameter of the front lens, aberration correction, the number of lens element, and cost performance.

Conditional expressions according to the present invention are explained below.

Conditional expression (1) defines an appropriate range of a value that the moving amount of the second lens group while zooming is normalized by the focal length in the wide-angle end state and is multiplied with the zoom ratio. The condition is for realizing a practical size and extremely good aberration correction in a two-group type zoom lens system having a high zoom ratio that has never accomplished by a two-group type zoom lens system. In other words, this condition defines an appropriate range of the moving amount of the second lens group normalized by the focal length in the wide-angle end state relative to the specific zoom range (specification). As is understood from conditional expression (1), when the zoom ratio becomes large, the appropriate range of the moving amount of the second lens group shifts toward a small value. Thus, conditional expression (1) indicates a balance between the specific zooming range (specification) and the size of the zoom lens system.

When the value $|X_2| \cdot f_t / f_w^2$ exceeds the upper limit of conditional expression (1), the moving amount of the second lens group becomes excessively large in the specific zoom ratio, so that the whole optical system becomes huge. Moreover, since the f-number in the telephoto end state becomes large (i.e. slow lens), the specification becomes poor as a commonly used standard zoom lens. Furthermore, if the lens is forcibly made compact, it becomes difficult for a lens barrel to design. As a result, it cannot be realized.

On the other hand, when the value falls below the lower limit of conditional expression (1), the moving amount of the second lens group becomes excessively small in the specific zoom ratio. This means, in two-group type zoom lens system, that the refractive power of the second lens group becomes excessively strong. When the second lens group has excessively strong refractive power in a zoom lens system having a high zoom ratio as the present invention, correction of spherical aberration and coma becomes worse Moreover, variation of various aberrations while zooming becomes large, the lower coma becomes worse and the upper coma excessively increases in the telephoto state, so that good aberration correction becomes impossible. As a result, it becomes difficult to design a zoom lens system having a high zoom ratio.

Further, when the lower limit of conditional expression (1) is set to 4.8 or over, various aberrations in the telephoto state can be corrected better. In addition, when the lower limit is set to 5.0 or over, it is more preferable that the even better optical performance of the present invention can be expected.

Conditional expression (2) defines an appropriate range of the refractive power of the first lens group G1. Generally, in a two-group type zoom lens system, when the following expression is satisfied, the total lens length in the wide-angle end state becomes equal to that in the telephoto end state, and the variation in the total lens length while zooming becomes minimum:

$$f_1 = -(f_w \cdot f_t)^{1/2}$$

where $f_1$ denotes the focal length of the first lens group G1, $f_w$ denotes the focal length of the zoom lens system in the wide-angle end state, and $f_t$ denotes the focal length of the zoom lens system in the telephoto end state.

In a zoom lens system, when a high zoom ratio that has never been accomplished by a two-group type zoom lens system, practical compactness, and low cost are the main purpose, like the present invention, it is undesirable to deviate excessively from this condition.

When the ratio $|f_1|/(f_w \cdot f_t)^{1/2}$ exceeds the upper limit of conditional expression (2), the variation of the total lens length while zooming becomes large, and the total lens length in the wide-angle end state becomes maximum. Particularly the first lens group becomes large, so that the diameter of a filter increases and the weight also increases. As a result, compactness and low cost, which is one of the purposes of the present invention, cannot be accomplished.

Further, when the upper limit of conditional expression (2) is set to 1.2 or less, more compactness and small diameter can be accomplished In addition, to obtain satisfactory optical performance of the present invention, it is desirable to employ an upper limit of 1.1 or less at conditional expression (2).

On the other hand, when the ratio falls below the lower limit of conditional expression (2), the total lens length in the telephoto end state becomes maximum contrary to the case exceeding the upper limit. Accordingly, in the same way as exceeding the upper limit, the variation in the total lens length while zooming becomes large, so it is undesirable. Moreover, since the total lens length in the wide-angle end state becomes minimum, it is advantageous for the compactness and small diameter of the first lens group. However, in a zoom lens system having a high zoom ratio as the present invention, it becomes difficult to correct aberrations such as lower coma and distortion in the wide-angel state and spherical aberration and lower coma in the telephoto state, so that it is undesirable.

In addition, to accomplish better correction of aberration, it is desirable to employ a lower limit of 0.8 or over at conditional expression (2). Moreover, to obtain satisfactory optical performance of the present invention, it is desirable to employ a lower limit of 0.9 or over at conditional expression (2).

Conditional expression (3) defines an appropriate range of the value that the focal length of the second lens group is normalized by the back focal length. As stated above, it is very important for accomplishing the zoom ratio and compactness of the present invention to suitably arrange the focal length (refractive power) of the second lens group. Moreover, when the focal length is normalized by the back focal length, a recommended range of the focal length of the second lens group, which Is suitable range used for a single lens reflex camera, can be set. Furthermore, in an ordinary two-group type zoom lens system, the back focal length becomes short when the focal length of the second lens group becomes short (namely, refractive power is increased). However, a value expressed by the conditional expression (3) has a reversed relation. Accordingly, in an optical system requiring a predetermined back focal length such as a single lens reflex camera for 35 mm film format, the optimum focal length of the second lens group can be set.

When the value $f_2/BF_w$ exceeds the upper limit of conditional expression (3), in an optical system securing sufficient back focal length, the focal length of the second lens group becomes too long, so that the optical system as a whole becomes huge. Moreover, when the refractive power of the second lens group becomes weak, the moving amount of the second lens group while zooming becomes large and the f-number in the telephoto state becomes dark, so that the zoom lens system is not good for a common-used standard zoom lens system. Furthermore, it is undesirable that the lens barrel design becomes difficult with the same reason.

In addition, to obtain satisfactory optical performance of the present invention, it is desirable to employ an upper limit of 1.5 or less at conditional expression (3).

On the other hand, when the value falls below the lower limit of conditional expression (3), in an optical system securing sufficient back focal length, it is undesirable that the focal length of the second lens group becomes too short. Particularly, in the present invention having a high zoom ratio, when the second lens group has strong refractive power, correction of spherical aberration and coma becomes worse. Moreover, it causes drawbacks such as the variation of aberration while zooming becomes large, lower coma in the telephoto state become worse, and upper coma in the telephoto state increases excessively, so that good correction of aberration becomes difficult. As a result, it becomes difficult to design a zoom lens system with a high zoom ratio.

In addition, to accomplish better correction of aberration in the telephoto state, it is desirable to employ a lower limit of 0.8 or over at conditional expression (3). Moreover, to obtain satisfactory optical performance of the present invention, it is desirable to employ a lower limit of 0.85 or over at conditional expression (3).

Generally, in lens-element construction of a master lens of a two-group or three-group type zoom lens system whose leading lens group has a negative refractive powers a positive-positive-negative-positive lens-element construction such as, in a spherical lens system, the Ernoster type or the modified triplet type has been the minimum lens-element construction for providing good correction of aberration. Particularly, in the lens-element construction of the second lens group of a two-group type zoom lens system, this lens-element construction has been the best choice for accomplishing a light weight, compactness, and low cost.

However, since the present invention provides a practical design solution of a two-group type zoom lens system which has specifications close to the limit, it is necessary for the second lens group itself to be large aperture ratio, a short focal length, and a telephoto type. Moreover, in order to maintain practical size, it is desirable that the master lens can locate its principal point as close as possible to the object and also has a large aperture ratio. Accordingly, in order to correct off-axis aberration well, it is necessary for the master lens to have lens construction that the aperture stop is located as close as possible to the image. In the present invention, it is necessary that the refractive power arrangement between a positive lens group located to the object side of the aperture stop and a negative lens group located to the image side of it is the most suitable as shown in conditional expression (4).

When the ratio $f_{2F}/f_{2R}$ exceeds the upper limit of conditional expression (4), it means that the absolute value of the focal length $f_{2R}$ of the negative lens group $G_{2R}$ located to the image side of the aperture stop is larger than that $f_{2F}$ of the positive lens group $G_{2F}$ located to the object side of it. When the ratio excessively exceeds the upper limit, the sign may be reversed. In this case, since the optimum amount of the telephoto ratio of the second lens group itself cannot be maintained as stated above, the space to the first lens group cannot be maintained, and a high zoom ratio also becomes difficult to accomplish. In addition, when a high zoom ratio is forcibly accomplished, the first lens group has to be used in a weak refractive power state in consequence, so that the compactness and small diameter cannot be accomplished.

In addition, to accomplish a high zoom ratio, compactness, and a small diameter, it is desirable to employ an upper limit of −0.1 or less at conditional expression (4). Moreover, to obtain satisfactory optical performance of the present invention, it is desirable to employ an upper limit of −0.12 or less at conditional expression (4).

On the other hand, when the ratio falls below the lower limit of conditional expression (4), it means that the focal length $f_{2F}$ of the positive lens group $G_{2F}$ located to the object side of the aperture stop is larger than the absolute value of the focal length $f_{2R}$ of the negative lens group $G_{2R}$ located to the image side of the aperture stop. Accordingly, an excessive amount of telephoto ratio beyond an optimum amount is put on the second lens group itself. In this case, contrary to the case of exceeding the upper limit, although the space between the first lens group and the second lens group can be easily maintained, correction of aberration to the angle of view of the second lens group itself becomes worse. As a result, upper coma, curvature of field, and spherical aberration becomes worse, so that it is undesirable.

In addition, to obtain satisfactory optical performance of the present invention, it is desirable to employ a lower limit of −0.8 at conditional expression (4).

In order to keep practical size of a zoom lens system having a specification as the present invention, an introduction of an aspherical surface to the first lens group is very effective. In particular, when an aspherical surface is introduced to the concave side of the negative lens, correction for on-axis light flux from infinite object becomes effective, a height of off-axis incidence can be also small, and a front lens diameter can be smaller as well. Moreover, when the first lens group consists of two lens elements, a negative and a positive lenses, and the concave surface of the negative lens is formed with an aspherical surface, it is desirable that the first lens group can be thinner. Accordingly, satisfactory optical performance of the present invention can be obtained. From the point of view of cost saving, it is desirable that the aspherical lens is made by so-called compound type aspherical surface composed of glass and resin. Moreover, it is desirable that when the aspherical surface is denoted by a predetermined aspherical expression, the aspherical surface is based on a prolate spheroid or a paraboloid avoiding the conical coefficient κ from a spherical surface. The following effect can be expected by applying the conical coefficient κ to a surface based on a prolate spheroid or a paraboloid; displacement from a paraxial spherical surface can be larger even in the vicinity of the optical axis; even larger displacement can easily be set in the peripheral portion; it becomes easy that a differential coefficient of each portion of the aspherical surface can be infinitesimally changed. By applying such a conical coefficient, an employment of high order aberration and correction of on-axis and off-axis aberration in the same plane can be possible, so that good correction of aberration for a unique specification becomes possible. To increase degree of freedom for setting infinitesimal displacement to the aspherical surface defined by the present invention, it is desirable to employ odd number of orders such as $3^{rd}$ order and $5^{th}$ order or even higher orders such as $12^{th}$ order and $14^{th}$ order.

Conditional expression (5) defines an appropriate rage of the conical coefficient κ. in order to realize a high zoom ratio as the present invention, a practical size, and a low price, good aberration correction has to be carried out by only one aspherical surface.

When the value κ exceeds the upper limit of conditional expression (5), the surface becomes a surface based on a spherical surface or an oblate spheroid. In this case, a surface having extremely large displacement from the paraxial spherical surface in only the vicinity of maximum periphery compared with the vicinity of the optical axis becomes the reference surface. Accordingly, an excessive aberration correction effect appears relative to off-axis aberration corresponding to very high portion of image height particular in the wide-angle state. As a result, it causes bad influence on good correction of aberration, so that it is undesirable.

On the other hand, when the value κ falls below the lower limit of conditional expression (5), it means the surface becomes an aspherical surface based on a hyperboloid passing over a paraboloid. Accordingly, since negative refractive power in the peripheral portion of the lens decreases, the principal ray passes away from the optical axis. As a result, the front lens diameter increases, and, accordingly, it goes against a small diameter, so that it is undesirable.

In the present invention, the positive lens group $G_{2F}$ located in the second lens group to the object side of the aperture stop preferably includes a positive lens and a cemented positive lens. A negative lens composing the cemented positive lens preferably has higher refractive index than a positive lens composing the cemented positive lens. By using the construction, Petzval sum can be optimized, and spherical aberration and chromatic aberration can be also corrected well. A negative lens such as a plano-concave lens having a concave surface facing to the image side or a negative meniscus lens having a convex surface facing to the object side is preferably included in the negative lens group $G_{2R}$ located in the second lens group to the image side of the aperture stop Moreover, in order to optimize Petzval sum and to correct spherical aberration and lateral chromatic aberration, the negative lens is preferably a cemented negative lens cemented with a positive lens having lower refractive index than the negative lens.

The present invention can be applied not only to a two-group type zoom lens system having lens construction of a negative-positive type, but also to a three-group type zoom lens system having very simple lens construction similar to the aforesaid zoom lens system such as a negative-positive-negative type, a negative-positive-positive type having high zoom ratio, or the like.

Numerical examples of the zoom lens system according to the present invention will be explained below with reference to accompanying drawings

EXAMPLE 1

Figure 1B:
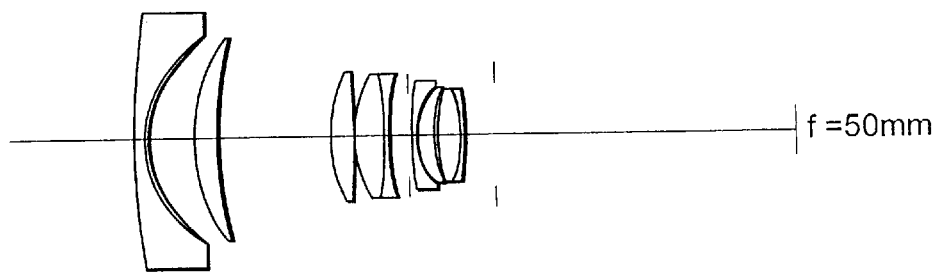
Figure 1C:
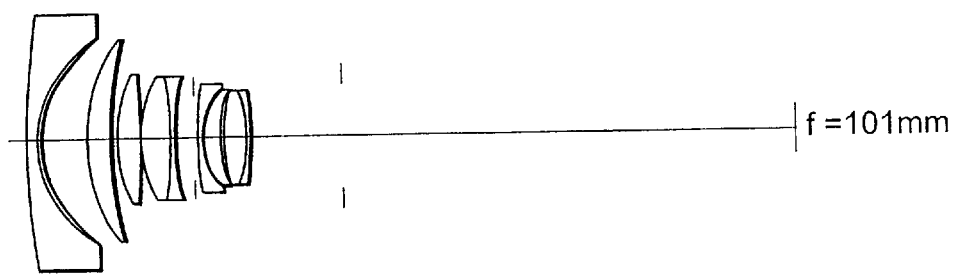

FIG. 1 is a diagram showing the lens arrangement of a zoom lens system according to Example 1 of the present invention, together with the movement of each lens group during zooming. The zoom lens system is composed of, in order from an object side, a first lens group G1 having a negative refractive power and a second lens group G2 having a positive refractive power. The first lens group G1 is composed of, in order from the object side, a negative lens group $G_{1F}$ and a positive lens group $G_{1R}$. The negative lens group $G_{1F}$ is composed of an aspherical negative meniscus lens having a convex surface facing to the object side, and having a so-called compound type aspherical surface composed of glass and resin facing to the image side. The positive lens group $G_{1R}$ is composed of a positive meniscus lens having a convex surface facing to the object side. The second lens group G2 has an aperture stop S in the middle of the group, and is composed of a positive lens group $G_{2F}$, which is the front lens group of the second lens group, located to the object side of the aperture stop S and a negative lens group $G_{2R}$, which is the rear lens group of the second lens group, located to the image side of the aperture stop S. The positive lens group $G_{2F}$ is composed of, in order from the object side, a double convex lens L21 and a cemented positive lens L22 composed of a double convex lens and a double concave lens. The negative lens group $G_{2R}$ is composed of, in order from the object side, a cemented negative meniscus lens L23 composed of a negative meniscus lens having a convex surface facing to the object side and a positive meniscus lens having a convex surface facing to the object side, and a cemented positive lens L24 composed of a double convex lens and a negative meniscus lens having a concave surface facing to the object side. In addition, a flare stopper FS, which is an independently movable fixed stop, is arranged to the most image side of the zoom lens system.

When the focal length is changed from the wide-angle end state to the telephoto end state, the first and second groups move such that the space between the first lens group G1 and the second lens group G2 decreases. In addition, focusing at closed object is carried out by moving the first lens group G1 to the object side.

Various values associated with Example 1 are listed below in Table 1. In specifications, f denotes the focal length, FNO denotes f-number, and 2 ω denotes an angle of view. In lens data, ri denotes the radius of curvature of the i-th lens surface Ri counted from the object side, di denotes a surface distance along the optical axis between the i-th lens surface Ri and the (i+1)th lens surface Ri+1, ni denotes the refractive index for d-line of the medium between the i-th lens surface Ri and the (i+1)th lens surface Ri+1, and vi denotes Abbe number of the medium between the i-th lens surface Ri and the (i+1)th lens surface Ri+1. An aspherical surface is expressed by the following equation in which y denotes the height in a vertical direction relative to the optical axis, S(y) denotes displacement (sag amount) in the optical axis direction from the tangent plane on the vertex of the aspherical surface at the height y, R denotes a reference radius of curvature, κ denotes the conical coefficient, and Cn denotes n-th order aspherical surface coefficient:

$$S(y)=(y^2/R)/[1+(1-\kappa \cdot y^2/R^2)^{1/2}]+C3\cdot|y|^3+C4\cdot y^4+C5\cdot|y|^5+C6\cdot y^6+C8\cdot y^8+C10\cdot y^{10}+C12\cdot y^{12}+C14\cdot y^{14}$$

In lens data, the aspherical surface is denoted by adding an asterisk "*" to the right side of the surface number and a paraxial radius of curvature is shown in the column r. In the respective Examples, the same reference signals and aspherical equation as Example 1 are used. Moreover, in the following each Example, "mm" is generally used for the unit of length of the focal length f, radius of curvature r, space between surfaces d, or the like unless otherwise specified. However, since an optical system proportionally enlarged or reduced its dimension can be obtained similar optical performance, the unit is not necessary to be limited to "mm" and any other suitable unit can be used.

TABLE 1

(Specifications)
f = 29 – 101
2ω = 76.4° – 24.1°
FNO = 3.6 – 5.9
(Lens Data)

| | r | d | ν | n | |
|---|---|---|---|---|---|
| 1) | 227.8307 | 2.0000 | 45.30 | 1.794997 | |
| 2) | 23.6000 | 0.5000 | 38.73 | 1.553070 | |
| 3*) | 18.8225 | 10.2500 | | 1.000000 | |
| 4) | 37.7566 | 5.5000 | 23.78 | 1.846660 | |
| 5) | 80.1526 | D5 | | 1.000000 | |
| 6) | 35.0421 | 4.2000 | 69.98 | 1.518601 | |
| 7) | −383.9328 | 0.1000 | | 1.000000 | |
| 8) | 23.9960 | 6.6000 | 55.52 | 1.696800 | |
| 9) | −63.1701 | 1.1000 | 37.17 | 1.834000 | |
| 10) | 47.6092 | 4.0000 | | 1.000000 | |
| 11>| ∞ | 1.0000 | | 1.00000 | Aperture Stop S |
| 12) | 69.9519 | 1.1000 | 37.17 | 1.834000 | |
| 13) | 14.2281 | 3.5000 | 64.10 | 1.516800 | |
| 14) | 19.8785 | 0.8000 | | 1.000000 | |
| 15) | 26.6397 | 5.0000 | 48.87 | 1.531720 | |
| 16) | −29.1126 | 1.0000 | 58.54 | 1.651600 | |
| 17) | −58.3156 | D17 | | 1.000000 | |
| 18) | ∞ | D18 | | 1.000000 | Fixed Stop FS |

(Aspherical Data)
Surface Number 3
k = 0.6606
  C3 = −0.11789 × 10⁻⁴      C4 = −2.86270 × 10⁻⁶
  C5 = −0.80588 × 10⁻⁶      C6 = 2.52910 × 10⁻⁸
  C8 = 2.30420 × 10⁻¹¹      C10 = −5.05960 × 10⁻¹³
  C12 = 0.13243 × 10⁻¹⁴     C14 = −0.14018 × 10⁻¹⁷

(Variable intervals while zooming and focusing)

| | 1-POS | 2-POS | 3-POS |
|---|---|---|---|
| f | 29.00000 | 50.00000 | 101.00000 |
| D0 | ∞ | ∞ | ∞ |
| D5 | 55.05897 | 23.19690 | 0.97908 |
| D17 | 0.98883 | 6.53283 | 19.99683 |
| D18 | 44.81942 | 57.75542 | 89.17141 |

| | 4-POS | 5-POS | 6-POS |
|---|---|---|---|
| β | −0.03333 | −0.03333 | −0.03333 |
| D0 | 818.2334 | 1448.2340 | 2978.2628 |

TABLE 1-continued

| D5 | 57.93253 | 24.86356 | 1.80415 |
|---|---|---|---|
| D17 | 0.98883 | 6.53283 | 19.99683 |
| D18 | 44.82514 | 57.76113 | 89.17712 |

| | 7-POS | 8-POS | 9-POS |
|---|---|---|---|
| β | −0.08468 | −0.14600 | −0.29492 |
| D0 | 290.6983 | 290.6983 | 290.6983 |
| D5 | 62.35897 | 30.49690 | 8.27908 |
| D17 | 0.98883 | 6.53283 | 19.99683 |
| D18 | 44.85670 | 57.86637 | 89.62531 |

In this case, the back focal length BF is D17+D18.
(Values for the conditional expressions)

$$|X_2| \cdot f_t / f_w^2 = 7.61 \quad (1)$$

$$|f_1|/(f_w \cdot f_t)^{1/2} = 0.924 \quad (2)$$

$$f_2/BF_w = 0.961 \quad (3)$$

$$F_{2F}/F_{2R} = -0.273 \quad (4)$$

$$\kappa = 0.6606 \quad (5)$$

FIGS. 2A to 2E graphically show various aberrations of the zoom lens system according to Example 1 in the wide-angle end state when the lens system is focused at an infinite distance. FIGS. 3A to 3E show various aberrations in the intermediate focal length state focused at an infinite distance. FIGS. 4A to 4E show various aberrations in the telephoto end state focused at an infinite distance. In the respective diagrams, FNO denotes the F-number, Y denotes an image height, and "d" and "g" denote aberrations for d-line and g-line, respectively. In the diagrams showing astigmatism, a solid line indicates a sagittal image plane and a broken line indicates a meridional image plane. In the aberration diagrams of the following each Example, the same symbols used in this Example are used. As is apparent from the respective diagrams showing the various aberrations, excellent compensation is made for the various aberrations at the respective focal length, wide-angle end, intermediate focal length, and telephoto end.

EXAMPLE 2

Figure 5A:
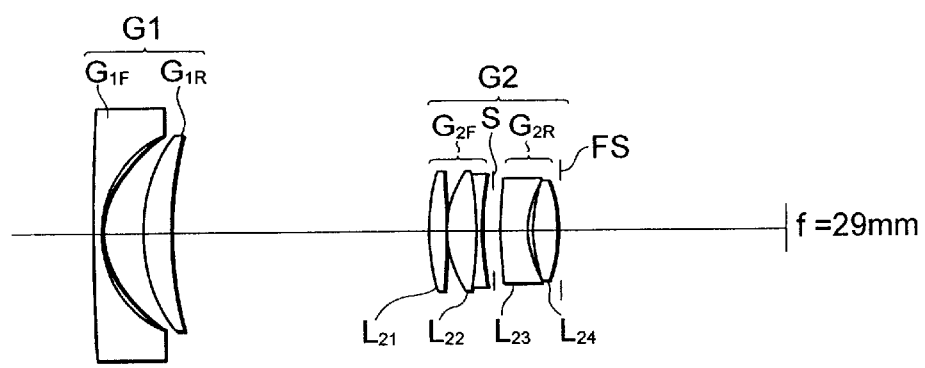
FIGS. 5A to 5C are diagrams showing the lens arrangement of a zoom lens system according to Example 2 of the present invention, together with the movement of each lens group during zooming.
Figure 5B:
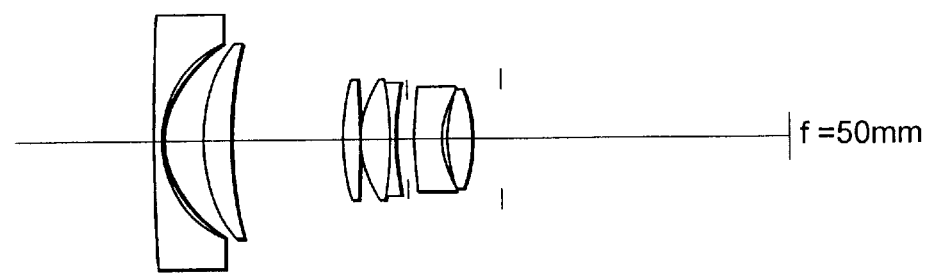
Figure 5C:
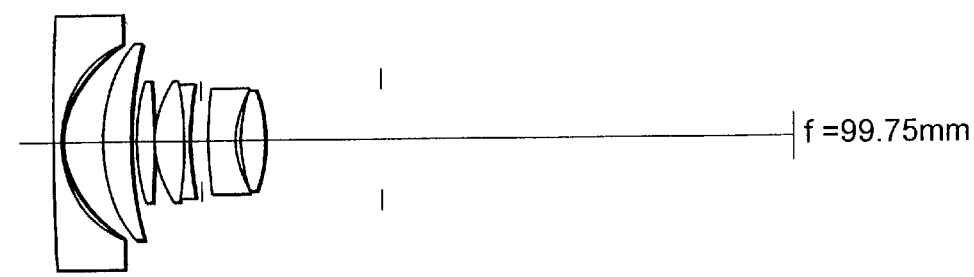

FIG. 5 is a diagram showing the lens arrangement of a zoom lens system according to Example 2 of the present invention, together with the movement of each lens group during zooming. The zoom lens system is composed of, in order from an object side, a first lens group G1 having a negative refractive power and a second lens group G2 having a positive refractive power. The first lens group G1 is composed of, in order from the object side, a negative lens group $G_{1F}$ and a positive lens group $G_{1R}$. The negative lens group $G_{1F}$ is composed of an aspherical negative meniscus lens having a convex surface facing to the object side, and having a so-called compound type aspherical surface composed of glass and resin facing to the image side. The positive lens group $G_{1R}$ is composed of a positive meniscus lens having a convex surface facing to the object side. The second lens group G2 has an aperture stop S in the middle of the group, and is composed of a positive lens group $G_{2F}$, which is the front lens group of the second lens group, located to the object side of the aperture stop S and a negative lens group $G_{2R}$, which is the rear lens group of the second lens group, located to the image side of the aperture stop S. The positive lens group $G_{2F}$ is composed of, in order from the object side, a double convex lens L21 and a cemented positive lens L22 composed of a double convex lens and a double concave lens. The negative lens group $G_{2R}$ is composed of, in order from the object side, a negative meniscus lens L23 having a convex surface facing to the object side and a double convex lens L24. In addition, a flare stopper FS, which is an independently movable fixed stop, is arranged to the most image side of the zoom lens system.

When the focal length is changed from the wide-angle end state to the telephoto end state, the first and second groups move such that the space between the first lens group G1 and the second lens group G2 decreases. In addition, focusing at closed object is carried out by moving the first lens group G1 to the object side.

Various values associated with Example 2 are listed below in Table 2.

TABLE 2

(Specifications)
f = 29 – 99.75
2ω = 76.3° – 24.4°
FNO = 3.6 – 5.9
(Lens Data)

| | r | d | ν | n | |
|---|---|---|---|---|---|
| 1) | 352.5641 | 2.0000 | 45.37 | 1.796681 | |
| 2) | 24.0000 | 0.2000 | 38.73 | 1.553070 | |
| 3*) | 18.1938 | 9.0500 | | 1.000000 | |
| 4) | 37.4301 | 6.0000 | 25.35 | 1.805182 | |
| 5) | 103.4786 | D5 | | 1.000000 | |
| 6) | 53.1509 | 3.6000 | 64.10 | 1.516800 | |
| 7) | −158.8191 | 0.1000 | | 1.000000 | |
| 8) | 23.5932 | 6.7000 | 60.14 | 1.620409 | |
| 9) | −62.4319 | 1.3000 | 37.35 | 1.834000 | |
| 10) | 83.8897 | 2.3000 | | 1.000000 | |
| 11> | ∞ | 1.7000 | | 1.000000 | Aperture Stop S |
| 12) | 192.7449 | 5.8300 | 37.35 | 1.834000 | |
| 13) | 20.1399 | 1.2000 | | 1.000000 | |
| 14) | 34.4818 | 5.0000 | 58.90 | 1.518230 | |
| 15) | −39.6056 | D15 | | 1.000000 | |
| 16) | ∞ | D16 | | 1.000000 | Fixed Stop FS |

(Aspherical Data)
Surface Number 3
K = 0.5735
  C3 = 0.0                C4 = −8.77920 × 10⁻⁶
  C5 = 0.0                C6 = −1.16640 × 10⁻⁸
  C8 = −5.21420 × 10⁻¹²   C10 = −9.62190 × 10⁻¹³
  C12 = 0.23945 × 10⁻¹⁵   C14 = −0.34981 × 10⁻¹⁸

(Variable intervals while zooming and focusing)

| | 1-POS | 2-POS | 3-POS |
|---|---|---|---|
| f | 29.00000 | 50.00000 | 99.75000 |
| D0 | ∞ | ∞ | ∞ |
| D5 | 56.03614 | 23.44993 | 1.00632 |
| D15 | 0.00000 | 7.56000 | 25.47000 |
| D16 | 49.60803 | 60.94803 | 87.81303 |

| | 4-POS | 5-POS | 6-POS |
|---|---|---|---|
| β | −0.03333 | −0.03333 | −0.03333 |
| D0 | 823.8676 | 1453.8739 | 2946.3889 |
| D5 | 58.90967 | 25.11658 | 1.84173 |
| D15 | 0.00000 | 7.56000 | 25.47000 |
| D16 | 49.60803 | 60.94803 | 87.81305 |

| | 7-POS | 8-POS | 9-POS |
|---|---|---|---|
| β | −0.12347 | −0.20067 | −0.44176 |
| D0 | 188.7318 | 203.0289 | 179.6589 |
| D5 | 66.68020 | 33.48324 | 12.07807 |
| D15 | 0.00000 | 7.56000 | 25.47000 |
| D16 | 49.60803 | 60.94803 | 87.81302 |

In this case, the back focal length BF is D15+D16.

(Values for the conditional expressions)

$$|X_2| \cdot f_t / f_w^2 = 7.55 \tag{1}$$

$$|f_1|/(f_w \cdot f_t)^{1/2} = 0.930 \tag{2}$$

$$f_2/BF_w = 0.907 \tag{3}$$

$$f_{2F}/f_{2R} = -0.238 \tag{4}$$

$$\kappa = 0.5735 \tag{5}$$

FIGS. 6A to 6E graphically show various aberrations of the zoom lens system according to Example 2 in the wide-angle end state when the lens system is focused at an infinite distance. FIGS. 7A to 7E show various aberrations in the intermediate focal length state focused at an infinite distance. FIGS. 8A to 8E show various aberrations in the telephoto end state focused at an infinite distance. As is apparent from the respective diagrams showing the various aberrations, excellent compensation is made for the various aberrations at the respective focal length, wide-angle end, intermediate focal length, and telephoto end.

EXAMPLE 3

Figure 9A:
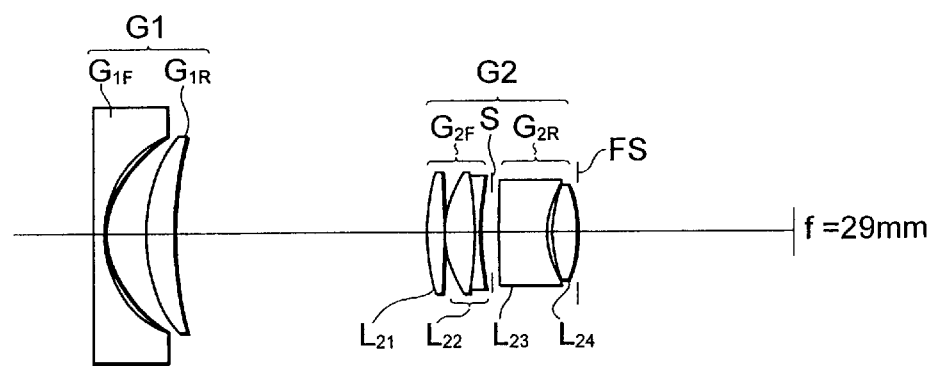
FIGS. 9A to 9C are diagrams showing the lens arrangement of a zoom lens system according to Example 3 of the present invention, together with the movement of each lens group during zooming.
Figure 9B:
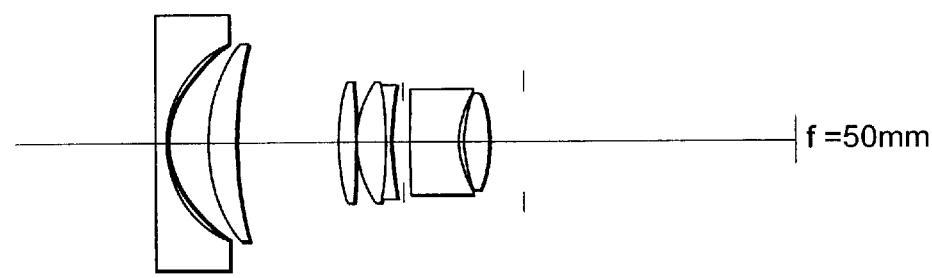
Figure 9C:
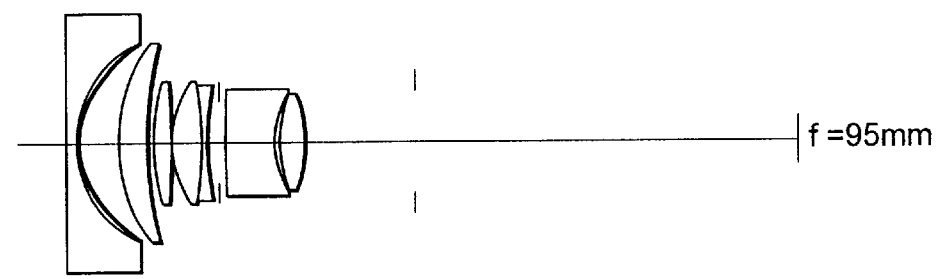
Figures 10A, 10B, 10C:
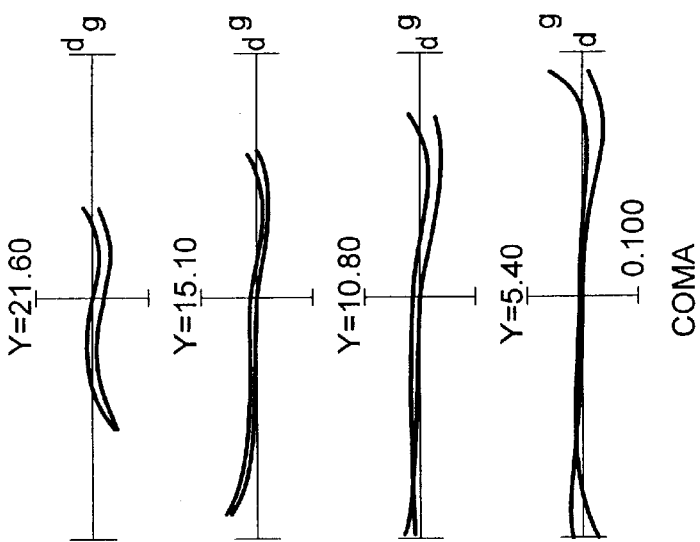
FIGS. 10A to 10E graphically show various aberrations of the zoom lens system according to Example 3 in the wide-angle end state when the lens system is focused at an infinite distance.
Figure 10D:
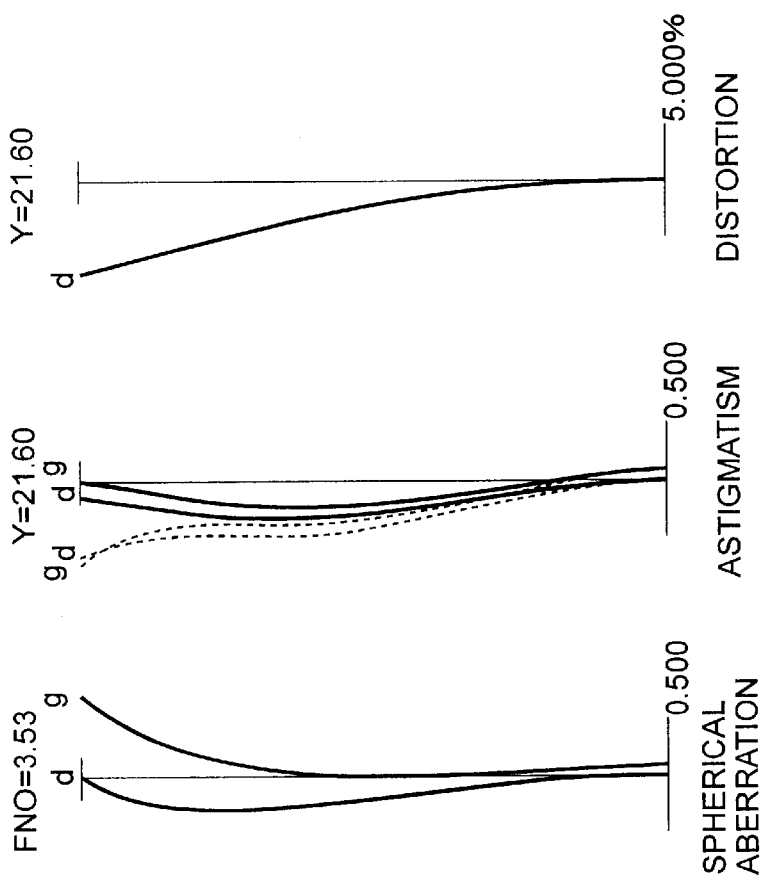
Figure 10E:
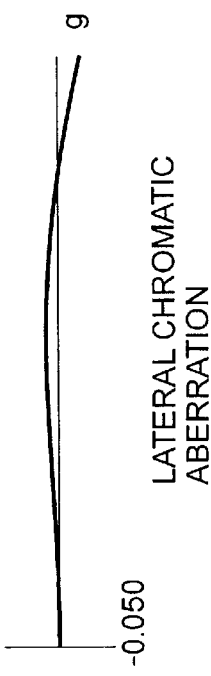

FIG. 9 is a diagram showing the lens arrangement of a zoom lens system according to Example 3 of the present invention, together with the movement of each lens group during zooming. The zoom lens system is composed of, in order from an object side, a first lens group G1 having a negative refractive power and a second lens group G2 having a positive refractive power. The first lens group G1 is composed of, in order from the object side, a negative lens group $G_{1F}$ and a positive lens group $G_{1R}$. The negative lens group $G_{1F}$ is composed of an aspherical negative meniscus lens having a convex surface facing to the object side, and having a so-called compound type aspherical surface composed of glass and resin facing to the image side. The positive lens group $G_{1R}$ is composed of a positive meniscus lens having a convex surface facing to the object side. The second lens group G2 has an aperture stop S in the middle of the group, and is composed of a positive lens group $G_{2F}$, which is the front lens group of the second lens group, located to the object side of the aperture stop S and a negative lens group $G_{2R}$, which is the rear lens group of the second lens group, located to the image side of the aperture stop S. The positive lens group $G_{2F}$ is composed of, in order from the object side, a double convex lens L21 and a cemented positive lens L22 composed of a double convex lens and a double concave lens. The negative lens group $G_{2R}$ is composed of, in order from the object side, a negative thick meniscus lens L23 having a convex surface facing to the object side and a double convex lens L24. In addition, a flare stopper FS, which is an independently movable fixed stop, is arranged to the most image side of the zoom lens system.

When the focal length is changed from the wide-angle end state to the telephoto end state, the first and second groups move such that the space between the first lens group G1 and the second lens group G2 decreases. In addition, focusing at closed object is carried out by moving the first lens group G1 to the object side.

Various values associated with Example 3 are listed below in Table 3.

TABLE 3

(Specifications)
f = 29 – 95
2ω = 76.2° – 25.6°
FNO = 3.5 – 6.0
(Lens Data)

| | r | d | ν | n | |
|---|---|---|---|---|---|
| 1) | 376.1814 | 2.0000 | 45.37 | 1.796681 | |
| 2) | 24.0000 | 0.2000 | 38.73 | 1.553070 | |
| 3*) | 18.3464 | 9.3000 | | 1.000000 | |
| 4) | 37.7291 | 5.7000 | 25.35 | 1.805182 | |
| 5) | 103.4122 | D5 | | 1.000000 | |
| 6) | 70.0936 | 3.0000 | 60.14 | 1.620409 | |
| 7) | –109.7991 | 0.1000 | | 1.000000 | |
| 8) | 24.5279 | 6.3000 | 60.14 | 1.620409 | |
| 9) | –85.4655 | 1.3000 | 37.35 | 1.834000 | |
| 10) | 59.3470 | 2.3000 | | 1.000000 | |
| 11> | ∞ | 1.7000 | | 1.000000 | Aperture Stop S |
| 12) | 2829.7941 | 11.3000 | 33.89 | 1.803840 | |
| 13) | 20.2692 | 0.8000 | | 1.000000 | |
| 14) | 26.3631 | 4.8000 | 48.97 | 1.531721 | |
| 15) | –38.6072 | D15 | | 1.000000 | |
| 16) | ∞ | D16 | | 1.000000 | Fixed Stop FS |

(Aspherical Data)
Surface Number 3
K = 0.4239
C3 = 0.0    C4 = –6.20390 × 10$^{-6}$
C5 = 0.0    C6 = –3.94510 × 10$^{-9}$
C8 = –1.14400 × 10$^{-11}$    C10 = –9.36790 × 10$^{-15}$
C12 = 0.0    C14 = 0.0

(Variable intervals while zooming and focusing)

| | 1-POS | 2-POS | 3-POS |
|---|---|---|---|
| f | 29.00000 | 50.00000 | 95.00000 |
| D0 | ∞ | ∞ | ∞ |
| D5 | 54.91392 | 22.32771 | 1.01192 |
| D15 | 0.01434 | 7.57434 | 23.77434 |
| D16 | 47.84667 | 59.18667 | 83.48667 |

| | 4-POS | 5-POS | 6-POS |
|---|---|---|---|
| β | –0.03333 | –0.03333 | –0.03333 |
| D0 | 824.0186 | 1454.0192 | 2804.0206 |
| D5 | 57.78748 | 23.99438 | 1.88911 |
| D15 | 0.01434 | 7.57434 | 23.77434 |
| D16 | 47.84666 | 59.18666 | 83.48667 |

| | 7-POS | 8-POS | 9-POS |
|---|---|---|---|
| β | –0.10208 | –0.17600 | –0.33440 |
| D0 | 238.1086 | 238.1086 | 238.1086 |
| D5 | 63.71392 | 31.12771 | 9.81192 |
| D15 | 0.01434 | 7.57434 | 23.77434 |
| D16 | 47.84662 | 59.18654 | 83.48619 |

In this case, the back focal length BF is D15+D16.
(Values for the conditional expressions)

$$|X_2| \cdot f_t / f_w^2 = 6.71 \tag{1}$$

$$|f_1|/(f_w \cdot f_t)^{1/2} = 0.953 \tag{2}$$

$$f_2/BF_w = 0.940 \tag{3}$$

$$f_{2F}/f_{2R} = -0.137 \tag{4}$$

$$\kappa = 0.4239 \tag{5}$$

FIGS. 10A to 10E graphically show various aberrations of the zoom lens system according to Example 3 in the wide-angle end state when the lens system is focused at an infinite distance. FIGS. 11A to 11E show various aberrations in the intermediate focal length state focused at an infinite distance. FIGS. 12A to 12E show various aberrations in the telephoto end state focused at an infinite distance. As is apparent from the respective diagrams showing the various aberrations, excellent compensation is made for the various aberrations at the respective focal length, wide-angle end, intermediate focal length, and telephoto end.

EXAMPLE 4

Figure 13A:
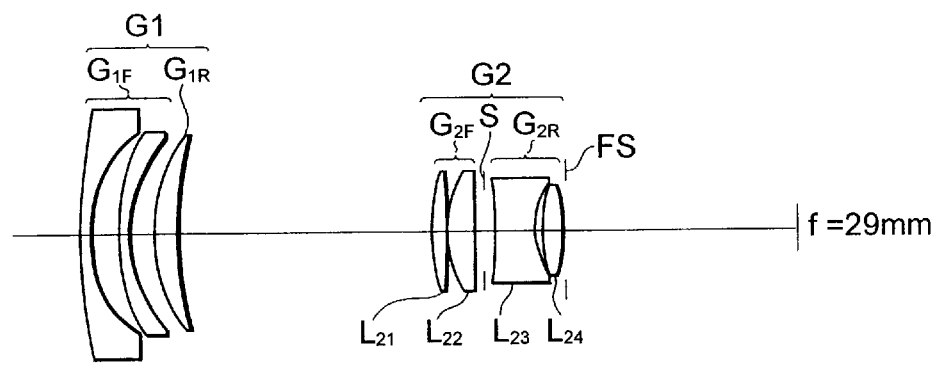
FIGS. 13A to 13C are diagrams showing the lens arrangement of a zoom lens system according to Example 4 of the present invention, together with the movement of each lens group during zooming.
Figure 13B:
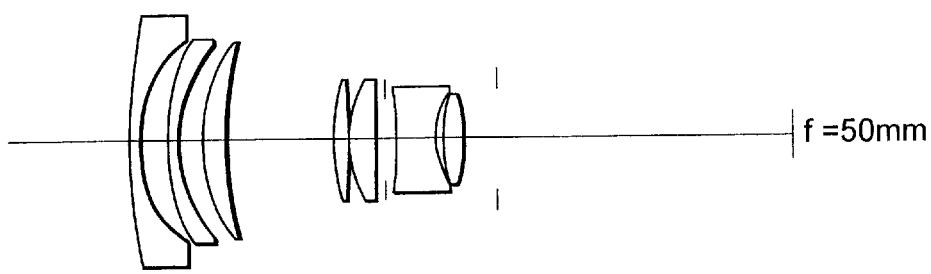
Figure 13C:
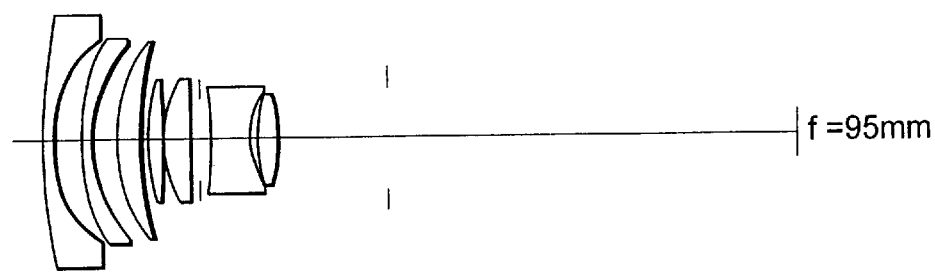
Figures 16A, 16B, 16C:
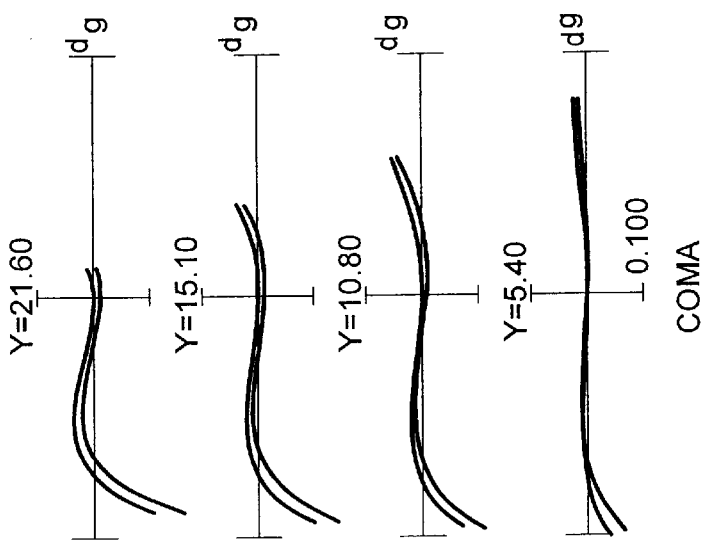
FIGS. 16A to 16E graphically show various aberrations of the zoom lens system according to Example 4 in the telephoto end state when the lens system is focused at an infinite distance.
Figure 16D:
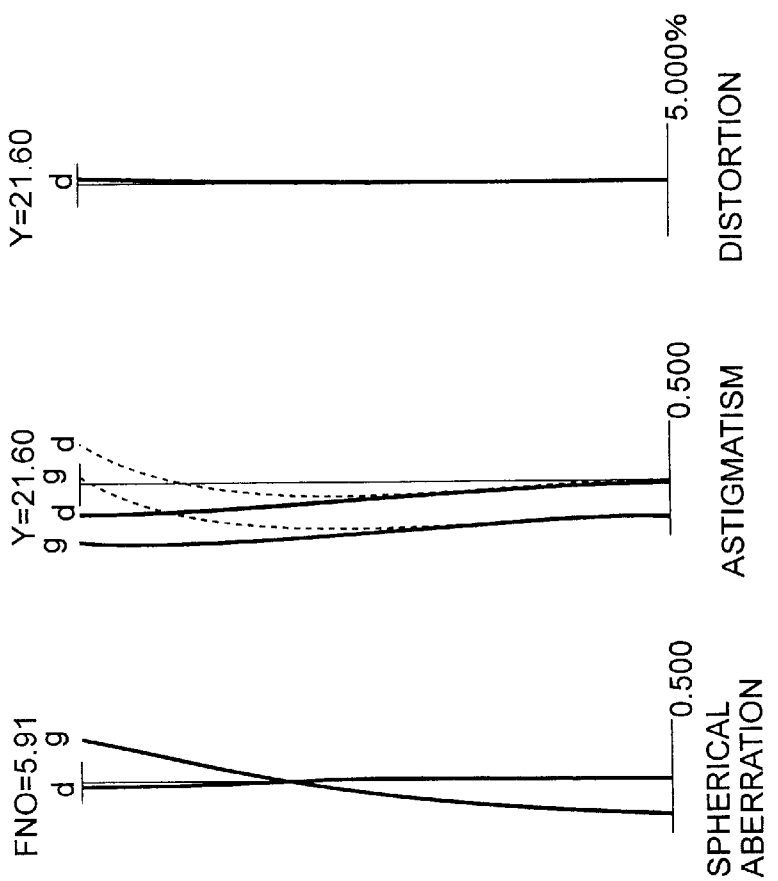
Figure 16E:
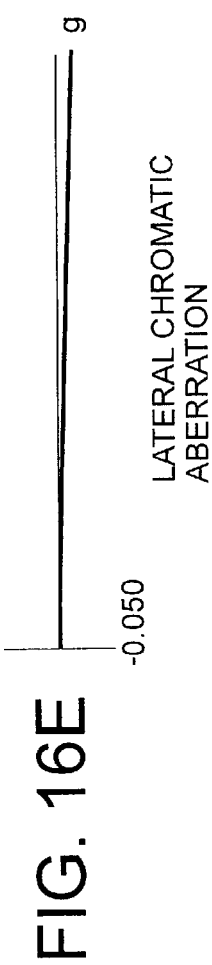

FIG. 13 is a diagram showing the lens arrangement of a zoom lens system according to Example 4 of the present invention, together with the movement of each lens group during zooming. The zoom lens system is composed of, in order from an object side, a first lens group G1 having a negative refractive power and a second lens group G2 having a positive refractive power. The first lens group G1 is composed of, in order from the object side, a negative lens group $G_{1F}$ and a positive lens group $G_{1R}$. The negative lens group $G_{1F}$ is composed of an aspherical negative meniscus lens having a convex surface facing to the object side, and having an aspherical surface facing to the image side, and a negative meniscus lens having a convex surface facing to the object side. The positive lens group $G_{1R}$ is composed of a positive meniscus lens having a convex surface facing to the object side. The second lens group G2 has an aperture stop S in the middle of the group, and is composed of a positive lens group $G_{2F}$, which is the front lens group of the second lens group, located to the object side of the aperture stop S and a negative lens group $G_{2R}$, which is the rear lens group of the second lens group, located to the image side of the aperture stop S. The positive lens group $G_{2F}$ is composed of, in order from the object side, a double convex lens L21 and a double convex lens L22. The negative lens group $G_{2R}$ is composed of, in order from the object side, a double concave lens L23 and a double convex lens L24. In addition, a flare stopper FS, which is an independently movable fixed stop, is arranged to the most image side of the zoom lens system.

When the focal length is changed from the wide-angle end state to the telephoto end state, the first and second groups move such that the space between the first lens group G1 and the second lens group G2 decreases. In addition, focusing at closed object is carried out by moving the first lens group G1 to the object side.

Various values associated with Example 4 are listed below in Table 4.

TABLE 4

(Specifications)
f = 29 – 95
2ω = 76.0° – 25.5°
FNO = 3.6 – 5.9
(Lens Data)

| | r | d | ν | n | |
|---|---|---|---|---|---|
| 1) | 130.8173 | 2.0000 | 45.37 | 1.796681 | |
| 2) | 25.2797 | 6.0000 | | 1.000000 | |
| 3*) | 50.2674 | 2.0000 | 45.37 | 1.796681 | |
| 4) | 29.6283 | 6.2000 | | 1.000000 | |
| 5) | 36.3441 | 5.0000 | 25.35 | 1.805182 | |
| 6) | 89.3067 | D6 | | 1.000000 | |
| 7) | 46.9820 | 3.2000 | 69.98 | 1.518601 | |
| 8) | −248.0916 | 0.1000 | | 1.000000 | |
| 9) | 22.6327 | 6.0000 | 69.98 | 1.518601 | |
| 10) | −3792.6130 | 2.0000 | | 1.000000 | |
| 11> | ∞ | 2.0000 | | 1.000000 | Aperture Stop S |
| 12) | −81.5900 | 8.7000 | 28.56 | 1.795040 | |
| 13) | 20.1740 | 1.4000 | | 1.000000 | |
| 14) | 41.2510 | 5.0000 | 35.70 | 1.625882 | |
| 15) | −44.4464 | D15 | | 1.000000 | |
| 16) | ∞ | D16 | | 1.000000 | Fixed Stop FS |

TABLE 4-continued (Aspherical Data)
Surface Number 3
K = 0.7111
  C3 = 0.0         C4 = −2.66220 × 10⁻⁶
  C5 = 0.0         C6 = −9.75330 × 10⁻¹⁰
  C8 = −3.77040 × 10⁻¹²   C10 = −4.2736 × 10⁻¹⁵
  C12 = 0.0        C14 = 0.0

(Variable intervals while zooming and focusing)

| | 1-POS | 2-POS | 3-POS |
|---|---|---|---|
| f | 29.00000 | 50.00000 | 95.00000 |
| D0 | ∞ | ∞ | ∞ |
| D6 | 55.01104 | 22.42483 | 1.10904 |
| D15 | 0.17127 | 7.73127 | 23.93127 |
| D16 | 48.30112 | 59.64112 | 83.94112 |

| | 4-POS | 5-POS | 6-POS |
|---|---|---|---|
| β | −0.03333 | −0.03333 | −0.03333 |
| D0 | 821.9663 | 1451.9670 | 2801.9940 |
| D6 | 57.88460 | 24.09149 | 1.98622 |
| D15 | 0.17127 | 7.73127 | 23.93127 |
| D16 | 48.30112 | 59.64113 | 83.94114 |

| | 7-POS | 8-POS | 9-POS |
|---|---|---|---|
| β | −0.07464 | −0.12424 | −0.24807 |
| D0 | 340.5122 | 354.4208 | 334.9202 |
| D6 | 61.44527 | 28.63670 | 7.63723 |
| D15 | 0.17127 | 7.73127 | 23.93127 |
| D16 | 48.30113 | 59.64115 | 83.94123 |

In this case, the back focal length BF is D15+D16.
(Values for the conditional expressions)

$$|X_2| \cdot f_t / f_w^2 = 6.71 \tag{1}$$

$$|f_1| / (f_w \cdot f_t)^{1/2} = 0.953 \tag{2}$$

$$f_2 / BF_w = 0.928 \tag{3}$$

$$f_{2F} / f_{2R} = -0.473 \tag{4}$$

$$\kappa = 0.7111 \tag{5}$$

FIGS. 14A to 14E graphically show various aberrations of the zoom lens system according to Example 4 in the wide-angle end state when the lens system is focused at an infinite distance. FIGS. 15A to 15E show various aberrations in the intermediate focal length state focused at an infinite distance. FIGS. 16A to 16E show various aberrations in the telephoto end state focused at an infinite distance. As is apparent from the respective diagrams showing the various aberrations, excellent compensation is made for the various aberrations at the respective focal length, wide-angle end, intermediate focal length, and telephoto end.

As described above, the present invention makes it possible to provide a standard zoom lens system having the following features: an angle of view of about 76°–24°; an f-number of about 3.5–5.6; a zoom ratio of about 3.5 which has not been accomplished by a negative-positive two-group type zoom lens system; lightweight, compact, and small diameter; and good cost performance.

According to the present invention, a compact, lightweight, low-priced photographic device equipped with the aforementioned zoom lens system makes it possible to take a photograph with a high zoom ratio.

Additional advantages and modification will readily occur to those skilled in the art. Therefore, the invention in its broader aspects is not limited to the specific details, and representative devices shown and described herein.

Accordingly, various modifications may be made without departing from the spirit or scope of the general inventive concept as defined by the appended claims and their equivalents.

What is claimed is:

1. A zoom lens system comprising, in order from an object side:

a first lens group having a negative refractive power; and a second lens group having a positive refractive power;

wherein zooming is carried out by varying the space between the first lens group and the second lens group;

wherein the first lens group includes, in order from the object side, a negative lens group $G_{1F}$ composed of one or two negative lens element and a positive lens group $G_{1R}$;

and wherein the following conditional expressions are satisfied;

$$4.5 \leq |X_2| \cdot f_t/f_w^2 \leq 15 \qquad (1)$$

$$0.7 \leq |f_1|/(f_w \cdot f_t)^{1/2} \leq 1.3 \qquad (2)$$

where $X_2$ denotes the maximum moving amount of the second lens group while zooming, $f_1$ denotes the focal length of the first lens group, $f_w$ denotes the focal length of the zoom lens system in a wide-angle end state, and $f_t$ denotes the focal length of the zoom lens system in a telephoto end state.

2. The zoom lens system according to claim 1, wherein the following conditional expression is satisfied:

$$0.6 \leq f_2/BF_w \leq 2 \qquad (3)$$

where $f_2$ denotes the focal length of the second lens group, and $BF_w$ denotes the back focal length of the zoom lens system in the wide-angle end state.

3. The zoom lens system according to claim 2, wherein the second lens group further includes:

an aperture stop for defining an f-number of the zoom lens system;

a positive lens group $G_{2F}$ including at least two positive lens element located to the object side of the aperture stop; and a negative lens group $G_{2R}$ including at least one negative lens element located to an image side of the aperture stop;

and wherein the following conditional expression is satisfied:

$$-1 \leq f_{2F}/f_{2R} \leq -0.05 \qquad (4)$$

where $f_{2F}$ denotes the focal length of the positive lens group $G_{2F}$, and $f_{2R}$ denotes the focal length of the negative lens group $G_{2R}$.

4. The zoom lens system according to claim 3, wherein the negative lens group $G_{1F}$ in the first lens group includes at least one aspherical surface;

wherein the aspherical surface is defined by the following expression:

$$S(y)=(y^2/R)/[1+(1-\kappa \cdot y^2/R^2)^{1/2}]+C3\cdot|y|^3+C4\cdot y^4+C5\cdot|y|^5+C6\cdot y^6+C8\cdot y^8+C10\cdot y^{10}+C12\cdot y^{12}+C14\cdot y^{14}$$

where y denotes the height in a vertical direction relative to the optical axis, S(y) denotes displacement (sag amount) in the optical axis direction from the tangent plane on the vertex of the aspherical surface at the height y, R denotes a paraxial radius of curvature, $\kappa$ denotes the conical coefficient, and Cn denotes n-th order aspherical surface coefficient;

and wherein the conical coefficient $\kappa$ satisfies the following conditional expression;

$$0 \leq \kappa < 1 \qquad (5).$$

5. The zoom lens system according to claim 2, wherein the negative lens group $G_{1F}$ in the first lens group includes at least one aspherical surface;

wherein the aspherical surface is defined by the following expression:

$$S(y)=(y^2/R)/[1+(1-\kappa \cdot y^2/R^2)^{1/2}]+C3\cdot|y|^3+C4\cdot y^4+C5\cdot|y|^5+C6\cdot y^6+C8\cdot y^8+C10\cdot y^{10}+C12\cdot y^{12}+C14\cdot y^{14}$$

where y denotes the height in a vertical direction relative to the optical axis, S(y) denotes displacement (sag amount) in the optical axis direction from the tangent plane on the vertex of the aspherical surface at the height y, R denotes a paraxial radius of curvature, $\kappa$ denotes the conical coefficient, and Cn denotes n-th order aspherical surface coefficient;

and wherein the conical coefficient $\kappa$ satisfies the following conditional expression;

$$0 \leq \kappa < 1 \qquad (5).$$

6. The zoom lens system according to claim 1, wherein the second lens group further includes;

an aperture stop for defining an f-number of the zoom lens system;

a positive lens group $G_{2F}$ including at least two positive lens element located to the object side of the aperture stop; and a negative lens group $G_{2R}$ including at least one negative lens element located to an image side of the aperture stop;

and wherein the following conditional expression is satisfied:

$$-1 \leq f_{2F}/f_{2R} \leq -0.05 \qquad (4)$$

where $f_{2F}$ denotes the focal length of the positive lens group $G_{2F}$, and $f_{2R}$ denotes the focal length of the negative lens group $G_{2R}$.

7. The zoom lens system according to claim 6, wherein the negative lens group $G_{1F}$ in the first lens group includes at least one aspherical surface;

wherein the aspherical surface is defined by the following expression:

$$S(y)=(y^2/R)/[1+(1-\kappa \cdot y^2/R^2)^{1/2}]+C3\cdot|y|^3+C4\cdot y^4+C5\cdot|y|^5+C6\cdot y^6+C8\cdot y^8+C10\cdot y^{10}+C12\cdot y^{12}+C14\cdot y^{14}$$

where y denotes the height in a vertical direction relative to the optical axis, S(y) denotes displacement (sag amount) in the optical axis direction from the tangent plane on the vertex of the aspherical surface at the height y, R denotes a paraxial radius of curvature, $\kappa$ denotes the conical coefficient, and Cn denotes n-th order aspherical surface coefficient;

and wherein the conical coefficient $\kappa$ satisfies the following conditional expression;

$$0 \leq \kappa < 1 \qquad (5).$$

8. The zoom lens system according to claim 1, wherein the negative lens group $G_{1F}$ in the first lens group includes at least one aspherical surface;

wherein the aspherical surface is defined by the following expression:

$$S(y)=(y^2/R)/[1+(1-\kappa \cdot y^2/R^2)^{1/2}]+C3 \cdot |y|^3+C4 \cdot y^4+C5 \cdot |y|^5+C6 \cdot y^6+C8 \cdot y^8+C10 \cdot y^{10}+C12 \cdot y^{12}+C14 \cdot y^{14}$$

where y denotes the height in a vertical direction relative to the optical axis, S(y) denotes displacement (sag amount) in the optical axis direction from the tangent plane on the vertex of the aspherical surface at the height y, R denotes a paraxial radius of curvature, $\kappa$ denotes the conical coefficient, and Cn denotes n-th order aspherical surface coefficient;

and wherein the conical coefficient $\kappa$ satisfies the following conditional expression;

$$0 \leq \kappa < 1 \qquad (5).$$

9. A photographic device equipped with the zoom lens system according to claim 1.

* * * * *